(12) United States Patent
Yamamoto et al.

(10) Patent No.: US 12,553,136 B2
(45) Date of Patent: Feb. 17, 2026

(54) GRAIN-ORIENTED ELECTRICAL STEEL SHEET AND METHOD FOR MANUFACTURING THE SAME

(71) Applicant: NIPPON STEEL CORPORATION, Tokyo (JP)

(72) Inventors: Shinji Yamamoto, Tokyo (JP); Yoshiyuki Ushigami, Tokyo (JP); Shinsuke Takatani, Tokyo (JP); Shuichi Nakamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 1000 days.

(21) Appl. No.: 17/421,762

(22) PCT Filed: Jan. 16, 2020

(86) PCT No.: PCT/JP2020/001162
§ 371 (c)(1),
(2) Date: Jul. 9, 2021

(87) PCT Pub. No.: WO2020/149331
PCT Pub. Date: Jul. 23, 2020

(65) Prior Publication Data
US 2022/0090267 A1     Mar. 24, 2022

(30) Foreign Application Priority Data
Jan. 16, 2019    (JP) .................................. 2019-005201

(51) Int. Cl.
*C23C 22/07*     (2006.01)
*C21D 3/04*     (2006.01)
(Continued)

(52) U.S. Cl.
CPC ................ *C23C 22/07* (2013.01); *C21D 3/04* (2013.01); *C21D 8/0205* (2013.01);
(Continued)

(58) Field of Classification Search
CPC .................................................. C21D 2201/05
See application file for complete search history.

(56) References Cited

U.S. PATENT DOCUMENTS

2003/0180553 A1    9/2003   Shigesato et al.
2013/0292006 A1*   11/2013   Takahashi ............ C21D 8/1283
                                                            148/307
(Continued)

FOREIGN PATENT DOCUMENTS

EP     0 565 029 A1    10/1993
EP     2 664 689 A1    11/2013
(Continued)

OTHER PUBLICATIONS

"Testing methods for paints—Part 5 : Mechanical property of film—Section 1 : Bend test (cylindrical mandrel)", JIS K 5600-5-1, 1999, (ISO 1519: 1973), total 9 pages.

*Primary Examiner* — Joshua S Carpenter
(74) *Attorney, Agent, or Firm* — Birch, Stewart, Kolasch & Birch, LLP

(57) ABSTRACT

A grain-oriented electrical steel sheet includes a base steel sheet which contains Si and Mn, an intermediate layer which is disposed on a surface of the base steel sheet and contains a silicon oxide as a main component, and an insulation coating which is disposed on a surface of the intermediate layer. A final-annealed film is not substantially present on a surface of the base steel sheet. In a surface layer region of grain-oriented electrical steel sheet, a Mn-depletion layer having a valley portion of a Mn content in which a Mn content is lower than an average Mn content of the base steel sheet in a region deeper than the surface layer region is provided, and a Mn-rich layer having a peak portion of a Mn content in which a Mn content is higher than that in the valley portion of the Mn content is provided in a region (Continued)

closer to a surface of the insulation coating than the Mn-depletion layer.

17 Claims, 4 Drawing Sheets

(51) Int. Cl.
    *C21D 8/02*         (2006.01)
    *C21D 8/0221*       (2026.01)
    *C21D 9/46*         (2006.01)

(52) U.S. Cl.
    CPC ......... *C21D 8/0226* (2013.01); *C21D 8/0236* (2013.01); *C21D 9/46* (2013.01); *C21D 2201/05* (2013.01)

(56) References Cited

U.S. PATENT DOCUMENTS

| | | |
|---|---|---|
| 2014/0251514 A1 | 9/2014 | Watanabe et al. |
| 2014/0377573 A1 | 12/2014 | Okubo et al. |
| 2022/0042153 A1* | 2/2022 | Watanabe ............ C21D 8/1288 |

FOREIGN PATENT DOCUMENTS

| | | |
|---|---|---|
| JP | 5-279747 A | 10/1993 |
| JP | 6-184762 A | 7/1994 |
| JP | 7-278833 A | 10/1995 |
| JP | 9-78252 A | 3/1997 |
| JP | 4044739 B2 | 2/2008 |

* cited by examiner

GRAIN-ORIENTED ELECTRICAL STEEL SHEET AND METHOD FOR MANUFACTURING THE SAME

TECHNICAL FIELD

The present invention relates to a grain-oriented electrical steel sheet having an intermediate layer containing a silicon oxide as a main component, which has excellent adhesion of an insulation coating, and a method for manufacturing the same.

Priority is claimed on Japanese Patent Application No. 2019-5201, filed Jan. 16, 2019, the content of which is incorporated herein by reference.

BACKGROUND ART

Grain-oriented electrical steel sheets are used as iron core materials for transformers and the like, and are required to have magnetic properties represented by high magnetic flux density and low iron loss.

In order to ensure the magnetic properties of the grain-oriented electrical steel sheet, a texture of a base steel sheet is controlled, for example, to an orientation (Goss orientation) in which {110} planes are aligned parallel to sheet surfaces and the <100> axes are aligned in a rolling direction. In order to enhance accumulation of the Goss orientation, a secondary recrystallization process using AlN, MnS or the like as an inhibitor is widely used.

A coating is formed on a surface of the base steel sheet to reduce the iron loss of the grain-oriented electrical steel sheet. This coating is formed to apply tension to the base steel sheet to reduce the iron loss of a single steel sheet, and also to reduce the iron loss of an iron core by ensuring an electrical insulating property between the grain-oriented electrical steel sheets when the grain-oriented electrical steel sheets are stacked and used.

A grain-oriented electrical steel sheet having a three-layer structure of "base steel sheet 1/final-annealed film 2A/insulation coating 3" shown in FIG. 7 as a basic structure is known as the grain-oriented electrical steel sheet in which a coating is formed on the surface of the base steel sheet. For example, a grain-oriented electrical steel sheet in which a final-annealed film containing forsterite ($Mg_2SiO_4$) as a main component is formed on the surface of the base steel sheet and an insulation coating is formed on a surface of the final-annealed film is known. Each of the final-annealed film and the insulation coating has functions of imparting insulating property and imparting tension to the base steel sheet.

The final-annealed film is formed, for example, by a reaction of an annealing separator containing magnesia (MgO) as a main component with the base steel sheet during a heat treatment held in a temperature range of 600° C. to 1200° C. for 30 hours or more in final annealing in which secondary recrystallization occurs in the base steel sheet. Further, the insulation coating is formed by applying a coating solution containing, for example, phosphoric acid or a phosphate, colloidal silica, and a chromic anhydride or a chromate to the base steel sheet after final annealing and then baking and drying the base steel sheet in a temperature range of 300° C. to 950° C. for 10 seconds or more.

In order for the coatings to exhibit the desired tension and insulating property, these coatings should not peel from the base steel sheet, and these coatings are required to have high adhesion to the base steel sheet.

The adhesion between the coatings and the base steel sheet is mainly ensured by an anchor effect due to unevenness of an interface between the base steel sheet and the final-annealed film. However, the unevenness of the interface also hinders a domain wall motion when the grain-oriented electrical steel sheet is magnetized, and thus also becomes a factor which hinders an action of reducing the iron loss. Therefore, the following techniques have been implemented in order to reduce the iron loss of grain-oriented electrical steel sheets by smoothing the above-described interface and ensuring the adhesion of the insulation coating without the presence of the final-annealed film.

For example, in order to improve the adhesion of the insulation coating to the smoothed surface of the base steel sheet, it has been proposed to form an intermediate layer (a base film) between the base steel sheet and the insulation coating. For example, Patent Document 1 discloses a method of applying an aqueous solution of a phosphate or an alkali metal silicate and forming an intermediate layer. Patent Documents 2 to 4 disclose a method of forming an externally oxidized type silicon oxide film as an intermediate layer by performing a heat treatment on a steel sheet for several tens of seconds to several minutes in which temperature and atmosphere are appropriately controlled.

A coating structure of a grain-oriented electrical steel sheet in which an interface between the base steel sheet and the coating is macroscopically and uniformly smoothed using an intermediate layer has a three-layer structure of "base steel sheet 1/intermediate layer 2B/insulation coating 3" shown in FIG. 1 as a basic structure.

The intermediate layer 2B made of an externally oxidized type silicon oxide film exhibits a certain effect on improving the adhesion of the insulation coating 3 and reducing the iron loss due to smoothing of unevenness of an interface between the base steel sheet 1 and the intermediate layer 2B. However, in particular, the adhesion of the insulation coating is not sufficient for practical use, and thus technological development is being promoted.

For example, Patent Document 5 discloses a grain-oriented electrical steel sheet which has an externally oxidized layer containing silica as a main component and in which an oxide having a film thickness of 2 nm or more and 500 nm or less and composed of one or more elements selected from iron, aluminum, titanium, manganese and chromium occupies 50% or less in a cross-sectional area ratio on the interface between the tension applying insulation coating and the base steel sheet.

CITATION LIST

Patent Document

Patent Document 1

Japanese Unexamined Patent Application, First Publication No. H05-279747

Patent Document 2

Japanese Unexamined Patent Application, First Publication No. H06-184762

Patent Document 3

Japanese Unexamined Patent Application, First Publication No. H09-078252

Patent Document 4

Japanese Unexamined Patent Application, First Publication No. H07-278833

Patent Document 5

Japanese Patent No. 4044739

SUMMARY OF THE INVENTION

Problems to be Solved by the Invention

Although the grain-oriented electrical steel sheet having an intermediate layer containing a silicon oxide (for example, silicon dioxide ($SiO_2$)) as a main component disclosed in the above-described patent document has improved adhesion to the insulation coating to some extent and has succeeded in reducing the iron loss (that is, smoothing the surface of the base steel sheet), it cannot be said that the adhesion to the insulation coating is sufficient.

An object of the present invention is to provide a grain-oriented electrical steel sheet having an intermediate layer containing a silicon oxide as a main component, which has excellent adhesion to an insulation coating, and a method for manufacturing the same, based on the above-described circumstances.

Means for Solving the Problem

The gist of the present invention is as follows.

[1] A grain-oriented electrical steel sheet according to an aspect of the present invention is a grain-oriented electrical steel sheet including a base steel sheet which contains Si and Mn, an intermediate layer which is disposed on a surface of the base steel sheet and contains a silicon oxide as a main component, and an insulation coating which is disposed on a surface of the intermediate layer, wherein a final-annealed film is substantially not present on a surface of the base steel sheet, and in a surface layer region, a Mn-depletion layer having a valley portion of a Mn content in which a Mn content is lower than an average Mn content of the base steel sheet in a region deeper than the surface layer region is provided, and a Mn-rich layer having a peak portion of a Mn content in which a Mn content is higher than that in the valley portion of the Mn content is provided in a region closer to a surface of the insulation coating than the Mn-depletion layer.

[2] In the grain-oriented electrical steel sheet described in [1], in a profile for a depth of a Mn standardized optical emission intensity calculated using the following Equations 1-1 and 1-2 from data of an optical emission intensity and a measurement time of Mn measured by a glow-discharge optical emission analysis for the grain-oriented electrical steel sheet, when a point having a maximum depth among points having a Mn standardized optical emission intensity of 0.9 is defined as a point A, the surface layer region may be a region from the surface of the insulation coating to a depth of the point A, a point B at which the Mn standardized optical emission intensity is 0.50 or more and is the local maximum may be located in the surface layer region, a point C at which the Mn standardized optical emission intensity is the local minimum may be located between the point A and the point B in the surface layer region, the valley portion of the Mn content may be a region having a depth of 0.1 μm before and after the point C, the peak portion of the Mn content may be a region having a depth of 0.1 μm before and after the point B, and when an intermediate depth between the depth of the point B and the depth of the point C is defined as a boundary depth, and the Mn standardized optical emission intensity at the boundary depth is defined as a boundary Mn standardized optical emission intensity, the Mn-depletion layer may be a region from the boundary depth to the depth of the point A, and the Mn-rich layer may be present on the surface side of the insulation coating from the point B and may be a region from a depth of a point having the same Mn standardized optical emission intensity as the boundary Mn standardized optical emission intensity to the boundary depth.

Depth of $d$ μm of each of measurement points=measurement depth in unit μm after measurement end/time in unit seconds until measurement end×measurement time in unit seconds of measurement point    Equation 1-1

Mn standardized optical emission intensity at depth of $d$ μm=optical emission intensity of Mn at depth of $d$ μm/average optical emission intensity of Mn at depth of 25 μm to 30 μm    Equation 1-2

[3] In the grain-oriented electrical steel sheet described in [2], the point B and the point C in the surface layer region may satisfy a relationship of the following Equation 2.

Mn standardized optical emission intensity at point $B$−Mn standardized optical emission intensity at point $C$≥0.05    Equation 2

[4] In the grain-oriented electrical steel sheet described in [2] or [3], a distance between the point A and the point B in a depth direction calculated from the following Equation 3 may be 0 to 10.0 μm.

Distance between point $A$ and point $B$ in depth direction at unit μm=depth in unit μm at point $B$−depth in unit μm at point $A$    Equation 3

[5] In the grain-oriented electrical steel sheet described in any one of [2] to [4], the insulation coating may contain no Si, in a profile for a depth of a Si standardized optical emission intensity calculated using the following Equations 2-1 and 2-2 from data of an optical emission intensity and a measurement time of Si measured by the glow-discharge optical emission analysis for the grain-oriented electrical steel sheet, the surface layer region may have a point D at which the Si standardized optical emission intensity is the local maximum, and a distance between the point B and the point D in the depth direction calculated from the following Equation 4 may be 0 to 1.0 μm.

Depth $d$ μm of each of measurement points=measurement depth in unit μm after measurement end/time in unit seconds until measurement end×measurement time in unit seconds of measurement point    Equation 2-1

Si standardized optical emission intensity at depth of $d$ μm=optical emission intensity of Si at depth of $d$ μm/average optical emission intensity of Si at depth of 25 μm to 30 μm    Equation 2-2

Distance in unit μm between point $B$ and point $D$ in depth direction=depth in unit μm at point $B$−depth in unit μm at point $D$    Equation 4

[6] In the grain-oriented electrical steel sheet described in any one of [2] to [4], the insulation coating contain Si, when, in a profile for a depth of a Si standardized optical emission intensity calculated using the following Equations 2-1 and 2-2 from data of an optical emission intensity and a measurement time of Si measured by the glow-discharge optical emission analysis for the grain-oriented electrical steel sheet, and a profile for a depth of a Si difference quotient calculated using the following Equation 5-1, in the surface layer region, in a region in which the Si difference quotient is a negative value, a point at which the Si difference quotient is the local minimum and the Si difference quotient is −0.5 or less is defined as a point V, and a point at which the Si difference quotient is the local maximum, is present on the surface side of the insulation coating from the point V, and is closest to the point V is defined as a point Z, and in a profile for a depth of a Mn difference quotient calculated from the Mn standardized optical emission intensity using the following Equation 5-2, in the surface layer region, a point at which the Mn difference quotient is maximum is defined as a point Y, and a point at which the Mn difference quotient is minimum is defined as a point X, and a point which is present in a region from the point X to the point Y and at which the Mn difference quotient is 0 is defined as a point W, a distance between the point W and the point Z in the depth direction calculated from the following Equation 6 may be 0 to 1.0 μm, and the Mn difference quotient at the point Y and the Mn difference quotient at the point X may satisfy a relationship of the following Equation 7.

Depth $d$ μm of each of measurement points=measurement depth in unit μm after measurement end/time in unit seconds until measurement end×measurement time in unit seconds of measurement point    Equation 2-1

Si standardized optical emission intensity at depth of $d$ μm=optical emission intensity of Si at depth of $d$ μm/average optical emission intensity of Si at depth of 25 μm to 30 μm    Equation 2-2

Si difference quotient at depth of $d$ μm={Si standardized optical emission intensity at depth of $d$ μm-Si standardized optical emission intensity at depth $(d-h)$ μm}/$h$ μm    Equation 5-1

Mn difference quotient at depth $d$ μm={Mn standardized optical emission intensity at depth of $d$ μm-Mn standardized optical emission intensity at depth $(d-h)$ μm}/$h$ μm    Equation 5-2

Distance in unit μm between point $W$ and point $Z$ in the depth direction=depth in unit μm at point $W$-depth in unit μm at point $Z$    Equation 6

Mn difference quotient at point $Y$-Mn difference quotient at point $X$≥0.015    Equation 7

(here, in the above-described Equations 5-1 and 5-2, h indicates a sampling interval of the data in μm in the glow-discharge optical emission analysis)

[7] A method for manufacturing a grain-oriented electrical steel sheet according to another aspect of the present invention is a method for manufacturing the grain-oriented electrical steel sheet described in any one of [1] to [6], including, a hot rolling process of heating and then hot-rolling a slab containing Si and Mn and obtaining a hot-rolled steel sheet, a hot-band annealing process of performing hot-band annealing on the hot-rolled steel sheet and obtaining an annealed steel sheet, a cold rolling process of cold-rolling the annealed steel sheet once or twice or more with intermediate annealing interposed therebetween and obtaining a cold-rolled steel sheet, a decarburization annealing process of performing decarburization annealing on the cold-rolled steel sheet and obtaining a decarburization-annealed steel sheet, a final annealing process of heating the decarburization-annealed steel sheet in a state which an annealing separator having an MgO content of 10 mass % to 50 mass % is applied to the surface of the decarburization-annealed steel sheet, then removing the annealing separator on the surface, and obtaining a final-annealed steel sheet, an intermediate layer forming process of performing thermal oxidation annealing on the final-annealed steel sheet and forming an intermediate layer on a surface of the final-annealed steel sheet, and an insulation coating forming process of forming an insulation coating on the intermediate layer, wherein, in a cooling process of the final annealing process, when a final annealing temperature is 1100° C. or higher, T1 is set to 1100° C., and when the final annealing temperature is less than 1100° C., T1 is set as the final annealing temperature, cooling in a temperature range of T1 to 500° C. is performed in an atmosphere of an oxidation degree $(P_{H2O}/P_{H2})$ of 0.3 to 100,000, and in a cooling process of the insulation coating forming process, cooling in a temperature range of 800° C. to 600° C. is performed in an atmosphere of an oxidation degree $(P_{H2O}/P_{H2})$ of 0.10 to 0.30 for a residence time of 10 seconds to 60 seconds.

[8] A method for manufacturing a grain-oriented electrical steel sheet according to still another aspect of the present invention is a method for manufacturing the grain-oriented electrical steel sheet described in any one of [1] to [6], including, a hot rolling process of heating and then hot-rolling a slab containing Si and Mn and obtaining a hot-rolled steel sheet, a hot-band annealing process of performing hot-band annealing on the hot-rolled steel sheet and obtaining an annealed steel sheet, a cold rolling process of cold-rolling the annealed steel sheet once or twice or more with intermediate annealing interposed therebetween and obtaining a cold-rolled steel sheet, a decarburization annealing process of performing decarburization annealing on the cold-rolled steel sheet and obtaining a decarburization-annealed steel sheet, a final annealing process of heating the decarburization-annealed steel sheet in a state which an annealing separator having an MgO content of 10 mass % to 50 mass % is applied to the surface, then removing the annealing separator on the surface of the decarburization-annealed steel sheet, and obtaining a final-annealed steel sheet, and an intermediate layer and insulation coating forming process of forming an intermediate layer and an insulation coating on a surface of the final-annealed steel sheet in one process, wherein, in a cooling process of the final annealing process, when a final annealing temperature is 1100° C. or higher, T1 is set to 1100° C., and when the final annealing temperature is less than 1100° C., T1 is set as the final annealing temperature, cooling in a temperature range of T1 to 500° C. is performed in an atmosphere of an oxidation degree ($P_{H2O}/P_{H2}$) of 0.3 to 100,000, in the intermediate layer and insulation coating forming process, an atmosphere in a temperature range of 800° C. to 1150° C. is set to an oxidation degree ($P_{H2O}/P_{H2}$) of 0.05 to 0.18, and in a cooling process of the intermediate layer and insulation coating forming process, cooling in a temperature range of 800° C. to 600° C. is performed in an atmosphere of an oxidation degree ($P_{H2O}/P_{H2}$) of 0.10 to 0.30 for a residence time of 10 seconds to 60 seconds.

Effects of the Invention

According to the aspect of the present invention, it is possible to provide a grain-oriented electrical steel sheet having an intermediate layer containing a silicon oxide as a main component, which has excellent adhesion of an insulation coating, and a method for manufacturing the same.

The fact that excellent adhesion of the insulation coating (it may be simply described that adhesion is excellent) means that adhesion between the insulation coating and a layer below the insulation coating (the intermediate layer and the base steel sheet) is excellent.

EMBODIMENTS FOR IMPLEMENTING THE INVENTION

Figure 1:
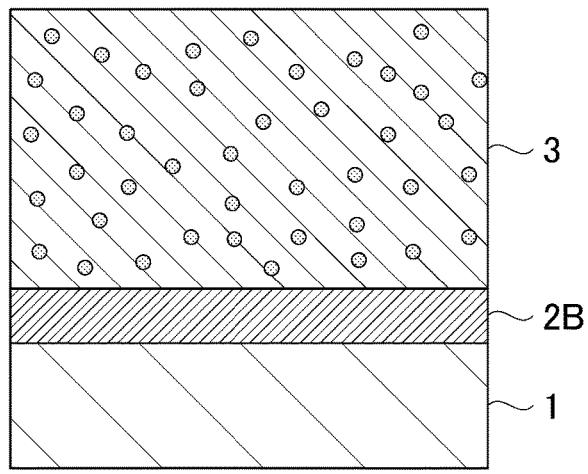
FIG. 1 is a diagram schematically showing a coating structure of a grain-oriented electrical steel sheet having an intermediate layer and an insulation coating.

Hereinafter, a grain-oriented electrical steel sheet and a method for manufacturing the same according to an embodiment of the present invention will be described in detail.

In the following description, when a numerical range is indicated by "a lower limit value to an upper limit value," it means "the lower limit value or more and the upper limit value or less" unless otherwise specified.

A. Grain-Oriented Electrical Steel Sheet

A grain-oriented electrical steel sheet according to the present embodiment is a grain-oriented electrical steel sheet having an intermediate layer containing a silicon oxide as a main component on a surface of a base steel sheet in which a final-annealed film is substantially not present on the surface and having an insulation coating on a surface of the intermediate layer. The grain-oriented electrical steel sheet has a Mn-depletion layer having a valley portion of a Mn content in which a Mn content is lower than an average Mn content of the base steel sheet in a region deeper than a surface layer region and has a Mn-rich layer having a peak portion of a Mn content in which a Mn content is higher than the valley portion of the Mn content in a region closer to a surface of the insulation coating than the Mn-depletion layer in the surface layer region.

The average Mn content of the base steel sheet is an average value of the Mn content in a region having a depth of 25 to 30 μm from a surface of the grain-oriented electrical steel sheet.

More specifically, the grain-oriented electrical steel sheet according to the present embodiment is characterized in that, in a profile for a depth of a Mn standardized optical emission intensity calculated using the following Equations 1-1 and 1-2 from data of an optical emission intensity and a measurement time of Mn measured by a glow-discharge optical emission analysis for the grain-oriented electrical steel sheet, when a point having a maximum depth among points at which the Mn standardized optical emission intensity is 0.9 is defined as a point A, the surface layer region is a region from the surface of the insulation coating to the depth of the point A, a point B at which the Mn standardized optical emission intensity is 0.50 or more a and is the local maximum is provided in the surface layer region, a point C at which the Mn standardized optical emission intensity is the local minimum is provided between the point A and the point B in the surface layer region, the valley portion of the Mn content is a region having a depth of 0.1 μm before and after the point C, the peak portion of the Mn content is a region having a depth of 0.1 μm before and after the point B, and also, when an intermediate depth between a depth of the point B and a depth of the point C is defined as a boundary depth, and the Mn standardized optical emission intensity at the boundary depth is defined as a boundary Mn standardized optical emission intensity, the Mn-depletion layer is a region from the boundary depth to the depth of the point A, and the Mn-rich layer is a region which is present on the surface side of the insulation coating from the point B and is located from a depth of a point having the same Mn standardized optical emission intensity as the boundary Mn standardized optical emission intensity to the boundary depth.

Depth $d$ μm of each of measurement points=(actual measurement depth after measurement end, unit μm)/(time until measurement end, unit second)× (measurement time of measurement point, unit second)   Equation 1-1

Mn standardized optical emission intensity at depth of $d$ μm=optical emission intensity of Mn at depth of $d$ μm/average optical emission intensity of Mn at depth of 25 μm to 30 μm   Equation 1-2

FIG. 1 schematically shows a coating structure of a grain-oriented electrical steel sheet having an intermediate layer containing a silicon oxide as a main component and an insulation coating on a surface of a base steel sheet in which a final-annealed film is substantially not present. The grain-oriented electrical steel sheet having the intermediate layer containing the silicon oxide as the main component on the surface of the base steel sheet in which the final-annealed film is substantially not present has a three-layer structure of "base steel sheet 1/intermediate layer 2B/insulation coating 3" shown in FIG. 1 as a basic structure.

Here, the purpose behind "the final-annealed film being substantially not present" will be described.

In a general grain-oriented electrical steel sheet, a final-annealed film composed of oxides such as forsterite ($Mg_2SiO_4$), spinel ($MgAl_2O_4$), and/or cordierite ($Mg_2Al_4Si_5O_{16}$) is interposed between the base steel sheet and the insulation coating, and adhesion between the oxide film (the final-annealed film and the insulation coating) and the base steel sheet is ensured by an anchor effect due to the complicated unevenness of the interface. When there is a portion in which the final-annealed film is not present even locally, it is not possible to ensure the adhesion between the base steel sheet and the insulation coating at that portion. Therefore, the final-annealed film is formed to cover the entire surface of the base steel sheet.

On the other hand, the grain-oriented electrical steel sheet according to the present embodiment does not require the final-annealed film to ensure the adhesion of the insulation coating. In the grain-oriented electrical steel sheet according to the present embodiment, not only when the final-annealed film is locally absent, but also even when the final-annealed film is completely absent, the adhesion of the insulation coating can be ensured. Further, the complicated unevenness of the interface due to the final-annealed film is not preferable for magnetic properties of the grain-oriented electrical steel sheet. Therefore, from the viewpoint of magnetic properties, there is no merit to leaving the final-annealed film, and preferably, the final-annealed film is completely absent.

However, in a manufacturing process of the grain-oriented electrical steel sheet according to the present embodiment, a situation in which the oxides such as forsterite, spinel and cordierite are slightly formed in a non-film form and also a situation in which the final-annealed film once formed slightly remains in a process in which it is removed are conceivable. The present embodiment does not preclude the presence of such oxides. That is, in consideration of such a form, it is defined that "the final-annealed film is substantially not present". Specifically, in observation of a cross-section of the grain-oriented electrical steel sheet, an observation area of oxides such as forsterite, spinel and cordierite is less than or equal to an observation area of the intermediate layer, preferably equal to or less than ½ thereof, and more preferably equal to or less than ⅒ thereof. Of course, it goes without saying that the best form is that in which the observation area of the oxides such as forsterite, spinel and cordierite is zero.

The present inventors have found that, in an electrical steel sheet having the intermediate layer containing a silicon oxide as a main component on the surface of the base steel sheet, a region in which Mn is deficient is inevitably generated in a region including the surface side of the base steel sheet and the intermediate layer in a final annealing process. Further, the inventors have found as a result of further studies that Mn becomes rich in the region including the surface side of the base steel sheet and the intermediate layer by cooling under specific conditions in the final annealing process and the process of forming the intermediate layer, and the adhesion of the insulation coating is excellent in the grain-oriented electrical steel sheet having the region in which Mn becomes rich.

Although it is not clear why the grain-oriented electrical steel sheet having the region in which Mn becomes rich has excellent adhesion of the insulation coating, it is considered to be because uneven distribution of Mn strengthens a chemical bond between the intermediate layer and the base steel sheet.

Hereinafter, the basic structure of the grain-oriented electrical steel sheet according to the present embodiment will be described, and then the grain-oriented electrical steel sheet according to the present embodiment will be described with reference to a profile obtained by the glow-discharge optical emission analysis (GDS). In the following description, the reference numerals in the drawings will be omitted except when the drawings are referred to.

1. Three-Layer Structure 1-1. Intermediate Layer

The intermediate layer is formed on the surface of the base steel sheet and contains a silicon oxide as a main component. The intermediate layer has a function of adhering the base steel sheet and the insulation coating with each other in the present embodiment.

In the grain-oriented electrical steel sheet according to the present embodiment, the intermediate layer is a layer which is present between the base steel sheet which will be described later and the insulation coating which will be described later.

The silicon oxide which is the main component of the intermediate layer is preferably $SiO_x$ (x=1.0 to 2.0), and more preferably $SiO_x$ (x=1.5 to 2.0). This is because the silicon oxide is more stable. Silica ($SiO_2$) can be formed when a heat treatment for forming the silicon oxide on the surface of the steel sheet is sufficiently performed.

In the present embodiment, using the silicon oxide as a main component satisfies conditions of an Fe content of less than 30 atomic %, a P content of less than 5 atomic %, a Si content of 20 atomic % or more and less than 50 atomic %, an O content of 50 atomic % or more and less than 80 atomic %, and a Mg content of 10 atomic % or less as a composition of the intermediate layer.

1-2. Insulation Coating

The insulation coating 3 is formed on the surface of the intermediate layer 2B as shown in FIG. 1. The insulation coating 3 has functions of applying tension to the base steel sheet 1 to reduce iron loss of the grain-oriented electrical steel sheet and also ensuring an electrical insulating property between the grain-oriented electrical steel sheets when the grain-oriented electrical steel sheets are stacked and used.

The insulation coating is not particularly limited, and can be appropriately selected and used from known ones according to the use and the like. The insulation coating may be, for example, an organic-based coating or an inorganic-based coating. Examples of the organic-based coating include a polyamine-based resin, an acrylic resin, an acrylic styrene resin, an alkyd resin, a polyester resin, a silicone resin, a fluoro-resin, a polyolefin resin, a styrene resin, a vinyl acetate resin, an epoxy resin, a phenol resin, a urethane resin, a melamine resin, and the like. Examples of the inorganic-based coating include a phosphate-based coating, an aluminum phosphate-based coating, and an organic-inorganic composite-based coating containing the above-described resin.

When a thickness of the insulation coating is reduced, the tension applied to the base steel sheet is reduced, and the insulating property is also lowered. Therefore, the thickness of the insulation coating is preferably 0.1 µm or more, and more preferably 0.5 µm or more. On the other hand, when the thickness of the insulation coating exceeds 10 µm, cracks may occur in the insulation coating in the stage of forming the insulation coating. Therefore, the thickness of the insulation coating is preferably 10 µm or less, and more preferably 5 µm or less.

The thickness of the insulation coating can be measured by observing a cross section of the insulation coating (or the grain-oriented electrical steel sheet) with a scanning electron microscope (SEM) or a transmission electron microscope (TEM). Preferably, the thickness of the insulation coating can be measured using the TEM in the same manner as the measurement of the thickness of the intermediate layer.

The insulation coating may be subjected to a magnetic domain refinement treatment which forms local microstrained regions or grooves, if necessary, by laser, plasma, mechanical, etching or other techniques.

1-3. Base Steel Sheet

In the grain-oriented electrical steel sheet according to the present embodiment, the adhesion of the insulation coating is improved by having the intermediate layer mainly containing a silicon oxide in contact with the base steel sheet, having the Mn-depletion layer in the surface layer region, and having the Mn-rich layer in a region closer to the surface of the insulation coating than the Mn-depletion layer. The definitions of the Mn-depletion layer and the Mn-rich layer will be described later.

A configuration such as a chemical composition and a texture of the base steel sheet in the grain-oriented electrical steel sheet according to the present embodiment is not directly related to the coating structure of the grain-oriented electrical steel sheet except that Si and Mn are contained as essential components. Therefore, the base steel sheet in the grain-oriented electrical steel sheet according to the present embodiment is not particularly limited as long as operational effects of the grain-oriented electrical steel sheet according to the present embodiment can be obtained, and, for example, a base steel sheet in a general grain-oriented electrical steel sheet may be used. Hereinafter, the base steel sheet in the grain-oriented electrical steel sheet according to the present embodiment will be described.

(1) Chemical Composition

A chemical composition of the base steel sheet of the general grain-oriented electrical steel sheet can be used as a chemical composition of the base steel sheet of the grain-oriented electrical steel sheet according to the present embodiment. The chemical composition of the base steel sheet contains, for example, the following elements. Unless otherwise specified, "%" used in the amounts of each of elements in the chemical composition of the base steel sheet means mass %. A lower limit value and an upper limit value are included in a numerical limitation range described with "to" interposed therebetween.

The base steel sheet of the grain-oriented electrical steel sheet according to the present embodiment contains, for example, Si of 0.50 to 7.00%, Mn of 0.05% to 1.00%, C of 0.005% or less, and N of 0.0050% or less, and a remainder thereof is composed of Fe and impurities. Hereinafter, the reason for limiting a typical example of the chemical composition of the base steel sheet of the grain-oriented electrical steel sheet according to the present embodiment will be described.

Si: 0.50 to 7.00%

Silicon (Si) increases electrical resistance of the grain-oriented electrical steel sheet and reduces the iron loss. When the Si content is less than 0.50%, such effects cannot be sufficiently obtained. Therefore, the Si content is preferably 0.50% or more. The Si content is more preferably 1.50% or more, and still more preferably 2.50% or more.

On the other hand, when the Si content exceeds 7.00%, a saturation magnetic flux density of the base steel sheet decreases, and the iron loss of the grain-oriented electrical steel sheet deteriorates. Therefore, the Si content is preferably 7.00% or less. The Si content is more preferably 5.50% or less, and still more preferably 4.50% or less.

Mn: 0.05% to 1.00%

Mn is an essential component which increases the electrical resistance of the base steel sheet to reduce the iron loss of the grain-oriented electrical steel sheet and strengthens the chemical bond between the base steel sheet and the silicon oxide to improve the adhesion. When the Mn content is in a range of 0.05% to 1.00%, good adhesion of the insulation coating can be obtained. Therefore, the Mn content is preferably 0.05% to 1.00%. The Mn content is more preferably 0.08% or more, and still more preferably 0.09% or more. The Mn content is more preferably 0.50% or less, and even more preferably 0.20% or less.

C: 0.005% or Less

Carbon (C) forms a compound in the base steel sheet and deteriorates the iron loss of the grain-oriented electrical steel sheet. Therefore, the C content is preferably 0.005% or less. The C content is more preferably 0.004% or less, and still more preferably 0.003% or less.

On the other hand, since the C content is preferably as low as possible, it may be 0%, but C may be contained as an impurity in the steel. Therefore, the C content may be more than 0%.

N: 0.0050% or Less

Nitrogen (N) forms a compound in the base steel sheet and deteriorates the iron loss of the grain-oriented electrical steel sheet. Therefore, the N content is preferably 0.0050% or less. The N content is more preferably 0.0040% or less, and still more preferably 0.0030% or less.

On the other hand, since the N content is preferably as low as possible, it may be 0%, but N may be contained as an impurity in the steel. Therefore, the N content may be more than 0%.

The remainder of the chemical composition of the base steel sheet is composed of Fe and impurities. The term "impurities" as used herein means elements which are mixed from components contained in raw materials or components mixed in the manufacturing process when the base steel sheet is industrially manufactured and do not substantially affect the effects obtained by the grain-oriented electrical steel sheet according to the present embodiment.

[Optional Element]

The chemical composition of the base steel sheet is basically that it contains the above-described elements and the remainder is composed of Fe and impurities, but may contain one or more optional elements instead of some of Fe for the purpose of improving the magnetic properties and solving manufacturing problems. Examples of the optional element contained in place of some of Fe include the following elements. Since these elements do not have to be contained, a lower limit thereof is 0%. On the other hand, when the amounts of the elements is too high, precipitates are generated, and the iron loss of the grain-oriented electrical steel sheet is deteriorated, or a ferrite transformation is curbed, and a GOSS orientation cannot be sufficiently obtained, or the saturation magnetic flux density decreases, and the iron loss of the grain-oriented electrical steel sheet deteriorates. Therefore, even when it is contained, it is preferably in the following range.

Acid-soluble Al: 0.0065% or less,
S and Se: 0.001% or less in total,
Bi: 0.010% or less,
B: 0.0080% or less,
Ti: 0.015% or less,
Nb: 0.020% or less,
V: 0.015% or less,
Sn: 0.50% or less,
Sb: 0.50% or less,
Cr: 0.30% or less,
Cu: 0.40% or less,
P: 0.50% or less,
Ni: 1.00% or less, and
Mo: 0.10% or less.

In addition, "S and Se: 0.001% or less in total" means that the base steel sheet may contain only one of S and Se, the amount of any one of S and Se may be 0.001% or less, and the base steel sheet may contain both S and Se, the amount of S and Se may be 0.001% or less in total.

The chemical composition of the base steel sheet of the grain-oriented electrical steel sheet according to the present embodiment described above can be obtained by adopting a method for manufacturing a grain-oriented electrical steel sheet according to the present embodiment using a slab having a chemical composition which will be described later.

The chemical composition of the base steel sheet of the grain-oriented electrical steel sheet according to the present embodiment may be measured using a spark optical emission spectrometry (Spark-OES). Further, when the content is very small, it may be measured using an inductively coupled plasma-mass spectrometry (ICP-MS) as needed. The acid-soluble Al may be measured by the ICP-MS using a filtrate obtained by thermally decomposing a sample with an acid. Further, C and S may be measured using a combustion-infrared absorption method, and N may be measured using an inert gas melting-thermal conductivity method.

2. Profile Obtained by Glow-Discharge Optical Emission Analysis

The grain-oriented electrical steel sheet according to the present embodiment has a Mn-depletion layer having a "valley portion of a Mn content" of which the Mn content is lower than the average Mn content of the base steel sheet in a region deeper than the surface layer region, and has a Mn-rich layer having a "peak portion of a Mn content" of which the Mn content is higher than the "valley portion of the Mn content" in a region closer to the surface of the insulation coating than the Mn-depletion layer, in the surface layer region. More specifically, in the grain-oriented electrical steel sheet according to the present embodiment, when a point having the maximum depth among points having a Mn standardized optical emission intensity of 0.9 is defined as a point A in a profile for a depth of a Mn standardized optical emission intensity calculated using the following Equations 1-1 and 1-2 from data of an optical emission intensity and a measurement time of Mn measured by the glow-discharge optical emission analysis (GDS), the surface layer region is a region from the surface of the insulation coating to a depth of the point A, a point B at which the Mn standardized optical emission intensity is 0.50 or more and is also the local maximum is provided in the surface layer region, a point C at which the Mn standardized optical emission intensity is the local minimum is provided between the point A and the point B in the surface layer region, the valley portion of the Mn content is a region having a depth of 0.1 μm before and after the point C, and the peak portion of the Mn content is a region having a depth of 0.1 μm before and after the point B, and also when an intermediate depth between a depth of the point B and a depth of the point C is defined as a boundary depth, and the Mn standardized optical emission intensity at the boundary depth is defined as a boundary Mn standardized optical emission intensity, the Mn-depletion layer is a region from the boundary depth to the depth of the point A, and the Mn-rich layer is a region which is present on the surface side of the insulation coating from the point B, and is located from a depth of a point having the same Mn standardized optical emission intensity as the boundary Mn standardized optical emission intensity to the boundary depth.

Depth $d$ μm of each of measurement points=(actual measurement depth after measurement end, unit μm)/(time until measurement end, unit second)× (measurement time of measurement point, unit second)  Equation 1-1

Mn standardized optical emission intensity at a depth of $d$ μm=Mn emission intensity at depth of $d$ μm/average optical emission intensity of Mn at depth of 25 μm to 30 μm  Equation 1-2

The Mn standardized optical emission intensity is a value which enables comparison of analytical values of grain-oriented electrical steel sheets having different Mn contents by dividing the optical emission intensity of Mn at a specific depth by the average optical emission intensity of Mn at a depth of 25 μm to 30 μm in which the composition of the grain-oriented electrical steel sheet is stable and then standardizing it.

An analysis of the optical emission intensity of Mn may be carried out from the surface of the grain-oriented electrical steel sheet with a measurement diameter of 3 mm in a sheet thickness direction using GDA750 manufactured by Rigaku Corporation. The same method may be used for an optical emission intensity of Si which will be described later.

In the grain-oriented electrical steel sheet according to the present embodiment, the adhesion of the insulation coating can be improved by a configuration on the surface side of the insulation coating (the grain-oriented electrical steel sheet) from the above-described point A. Therefore, a depth position from the surface of the insulation coating to the point A is defined as the surface layer region, and then the grain-oriented electrical steel sheet according to the present embodiment is identified.

Figure 2:
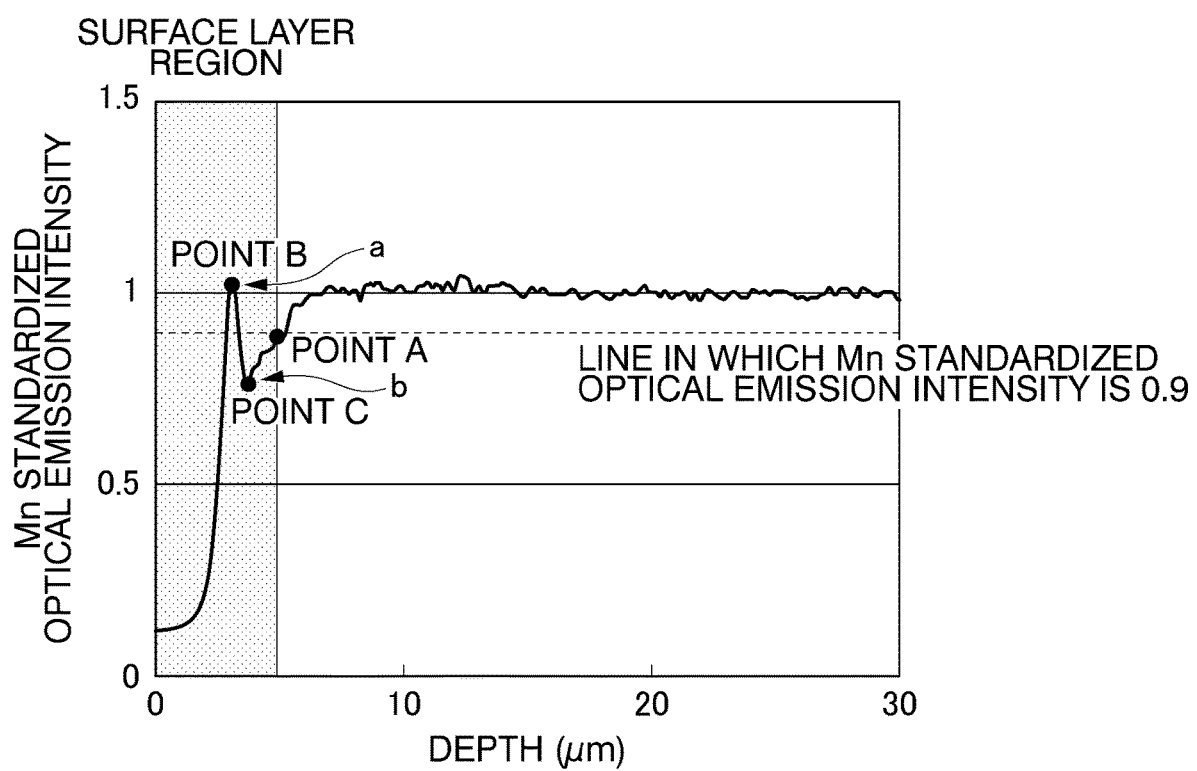
FIG. 2 is a diagram schematically showing a profile (a Mn profile) for a depth of a Mn standardized optical emission intensity in the grain-oriented electrical steel sheet (Example 1) according to the present embodiment which has an insulation coating containing no Si.

FIG. 2 shows a profile for a depth (μm) of the Mn standardized optical emission intensity measured by the glow-discharge optical emission analysis (GDS) (hereinafter, simply referred to as a Mn profile) in the grain-oriented electrical steel sheet according to the present embodiment. Further, FIG. 6 shows a typical Mn profile of the grain-oriented electrical steel sheet of the related art.

In the present embodiment, in the surface layer region, a region having a depth of 0.1 μm before and after the point (the point C in FIG. 2) at which the Mn standardized optical emission intensity is the local minimum (a region from a depth of "the depth of the point C-0.1 μm" to a depth of "the depth of the point C+0.1 μm") is defined as the valley portion of the Mn content (a region b in FIG. 2). In the surface layer region, a region having a depth of 0.1 μm before and after the point (the point B in FIG. 2) at which the Mn standardized optical emission intensity is 0.50 or more and is the local maximum (a region from a depth of "the depth of the point B-0.1 μm" to a depth of "the depth of the point B+0.1 μm") is defined as the peak portion of the Mn content (a region a in FIG. 2). An intermediate position between the depth of the point C and the depth of the point B is defined as a boundary position, and the Mn standardized optical emission intensity at the boundary position is defined as a boundary Mn standardized optical emission intensity. In the surface layer region, a region from a "point which is present closer to the surface of the insulation coating than the point B and has the same Mn standardized optical emission intensity as the boundary Mn standardized optical emission intensity" to the boundary Mn standardized optical emission intensity is defined as the Mn-rich layer. In the surface layer region, a region from the boundary Mn standardized optical emission intensity to a position of the point A is defined as the Mn-depletion layer.

In the example of the Mn profile shown in FIG. 2, among the points at which the Mn standardized optical emission intensity is 0.9, the point A having the maximum depth is present at a depth of 5 μm. Therefore, according to the above-described definition, a region having a depth of 5 μm or less from the surface of the insulation coating is the surface layer region.

Figure 6:
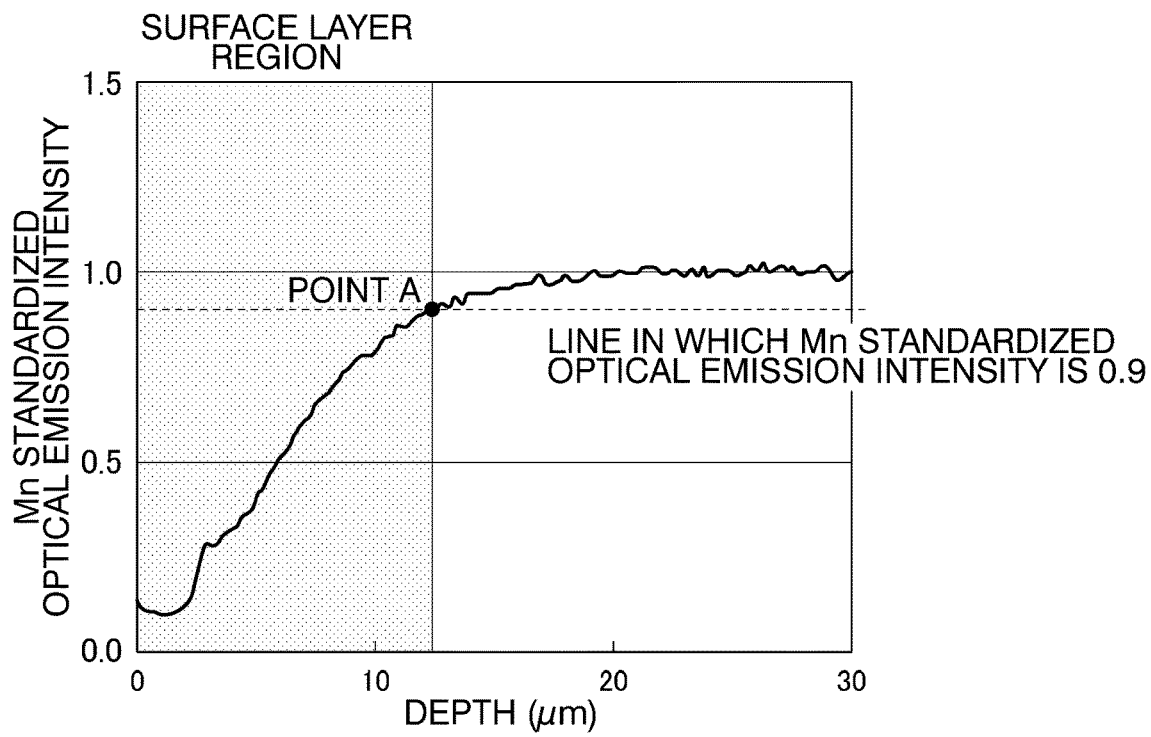
FIG. 6 is a diagram schematically showing a profile (a Mn profile) for a depth of a Mn standardized optical emission intensity in a grain-oriented electrical steel sheet according to a related art having an insulation coating containing Si.
Figure 7:
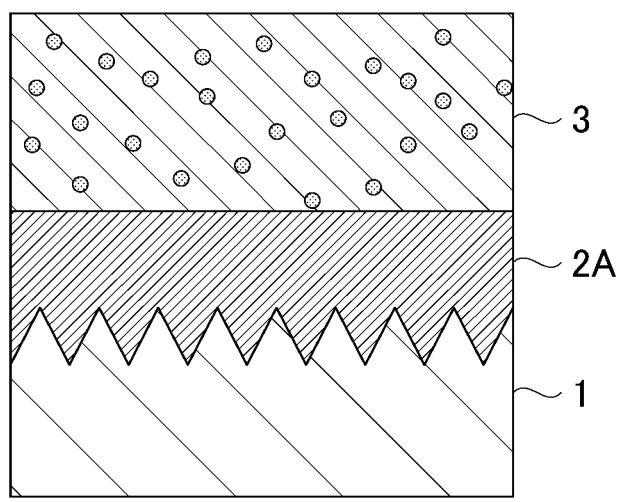
FIG. 7 is a diagram schematically showing a coating structure of a conventional grain-oriented electrical steel sheet having a final-annealed film and an insulation coating.

In the Mn profile of the grain-oriented electrical steel sheet of the related art shown in FIG. 6, among the points at which the Mn standardized optical emission intensity is 0.9, the point A having the maximum depth is present in the vicinity of the depth of 13 μm. Therefore, according to the above-described definition, a region having a depth of 13 μm or less from the surface of the insulation coating is the surface layer region. The grain-oriented electrical steel sheet of the related art refers to a grain-oriented electrical steel sheet having a three-layer structure of "base steel sheet 1/final-annealed film 2A/insulation coating 3" as shown in FIG. 7 as a basic structure.

In this way, the present inventors have confirmed that, in the grain-oriented electrical steel sheet having the three-layer structure of the "base steel sheet 1/intermediate layer 2B/insulation coating 3" shown in FIG. 1 as a basic structure, the Mn-depletion layer having the valley portion of the Mn content is formed in the surface layer region. In such a grain-oriented electrical steel sheet, the reason why the Mn-depletion layer having the valley portion of the Mn content is formed in the surface layer region is not clear. However, the present inventors presume that this is because Mn on the surface of the base steel sheet reacts with an annealing separator and is removed together with the annealing separator in the final annealing process which will be described later, and thus Mn in the surface layer region is deficient.

As shown in FIG. 6, in the grain-oriented electrical steel sheet of the related art, the Mn standardized optical emission intensity decreased monotonically toward the surface side of the insulation coating in the surface layer region. In the grain-oriented electrical steel sheet of the related art shown in FIG. 6, the Mn-depletion layer having the valley portion of the Mn content and the Mn-rich layer having the peak portion of the Mn content are not observed in the surface layer region.

On the other hand, in the grain-oriented electrical steel sheet according to the present embodiment, as shown in FIG. 2, it was confirmed that the point B at which the Mn standardized optical emission intensity was 0.50 or more and was the local maximum was present in the vicinity of a depth of 3 μm in the surface layer region. Further, in the grain-oriented electrical steel sheet according to the present embodiment shown in FIG. 2, the valley portion of the Mn content (the region b in FIG. 2), the peak portion of the Mn content (the region a in FIG. 2), the Mn-depletion layer and the Mn-rich layer were confirmed.

Figure 3:
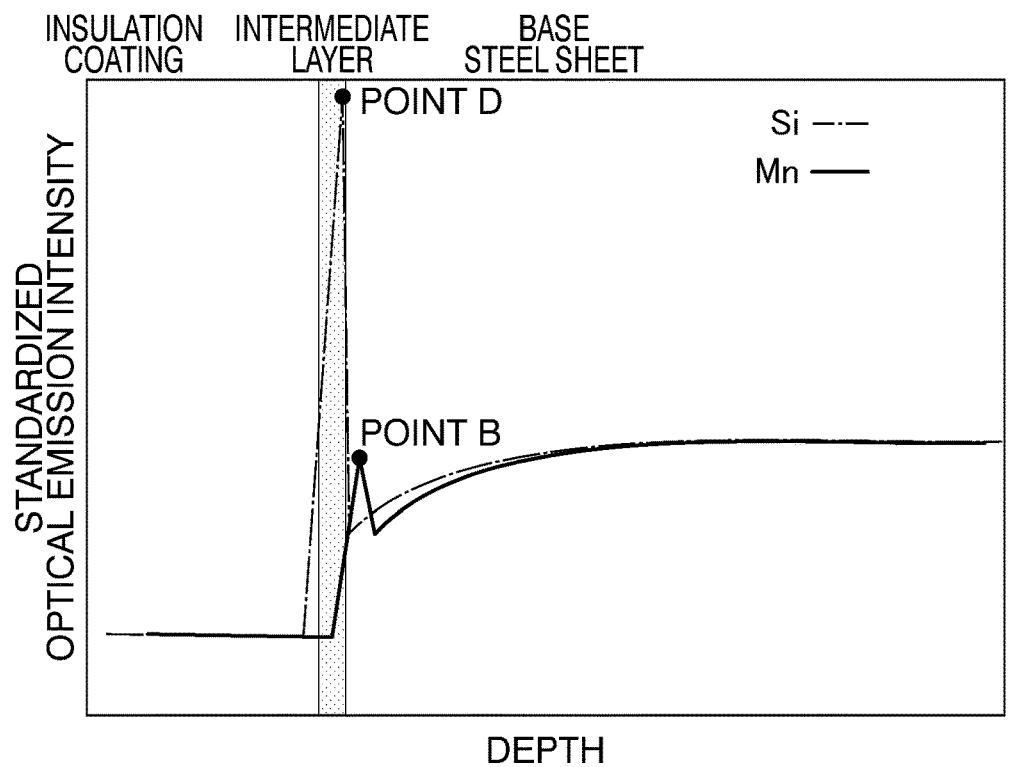
FIG. 3 is a diagram schematically showing a profile (a Mn profile) for a depth direction of a Mn standardized optical emission intensity and a profile (a Si profile) for a depth of a Si standardized optical emission intensity in the grain-oriented electrical steel sheet according to the present embodiment which has the insulation coating containing no Si.
Figure 4:
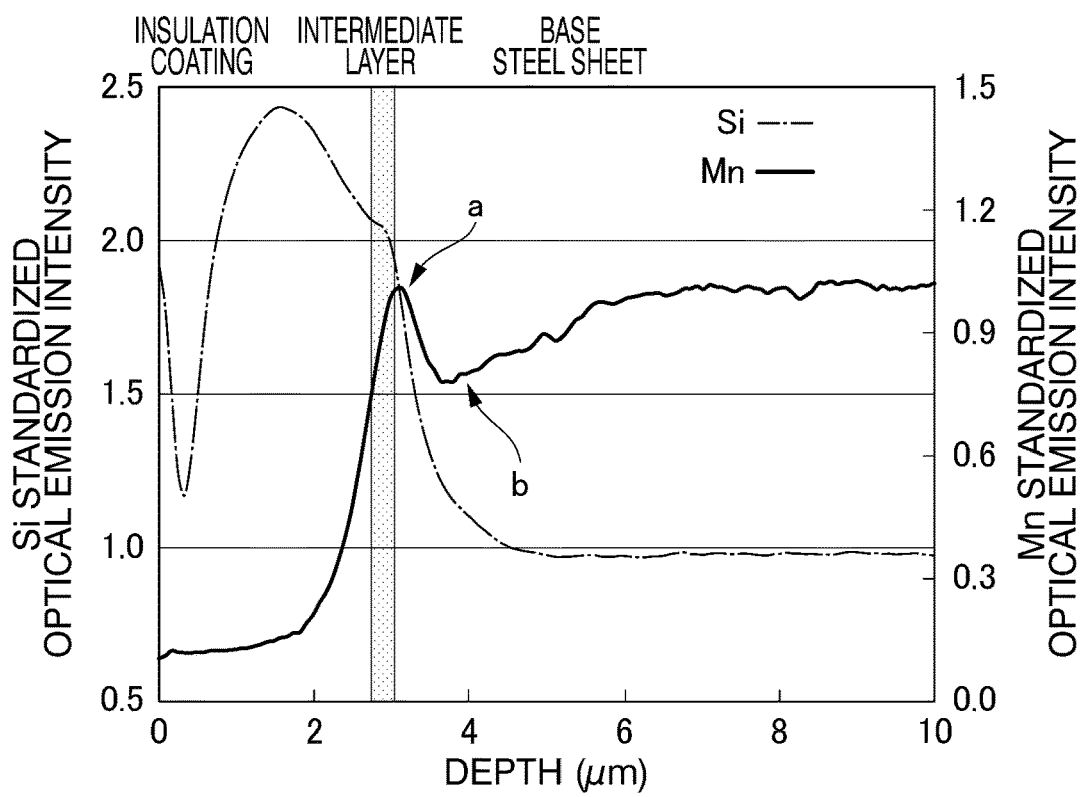
FIG. 4 is a diagram schematically showing a profile (a Mn profile) for a depth of a Mn standardized optical emission intensity and a profile (a Si profile) for a depth of a Si standardized optical emission intensity in a grain-oriented electrical steel sheet (Example 14) according to the present embodiment which has an insulation coating containing Si.

As shown in FIGS. 3 and 4, from a graph in which a Si profile and the Mn profile were superimposed, it was also confirmed that the point B was present in the vicinity of the surface of the base steel sheet. FIG. 3 is a diagram schematically showing the Mn profile and the Si profile obtained by the glow-discharge optical emission analysis in the grain-oriented electrical steel sheet according to the present embodiment having an insulation coating containing no Si. FIG. 4 is a diagram schematically showing the profile for the depth of the Mn standardized optical emission intensity (the Mn profile) and the profile for the depth of the Si standardized optical emission intensity (the Si profile) in the grain-oriented electrical steel sheet (Example 14 described later) according to the present embodiment having an insulation coating containing Si.

When compared with the grain-oriented electrical steel sheet of the related art, in the grain-oriented electrical steel sheet according to the present embodiment in which the Mn rich occurs in the vicinity of the surface of the base steel sheet, the reason why the adhesion of the insulation coating is improved is not clear, but it is conceivable that it is because the Mn-rich layer having the peak portion of the Mn content strengthens the chemical bond between the intermediate layer and the base steel sheet.

From the viewpoint of further enhancing the adhesion of the insulation coating, the Mn standardized optical emission intensity at the point B is preferably 0.55 or more, and more preferably 0.65 or more. The upper limit of the Mn standardized optical emission intensity at the point B is not particularly limited, but may be 1.50 as a feasible value.

As shown in FIG. 2, preferably, the point C which is present between the points A and B and at which the Mn standardized optical emission intensity is the local minimum, and the point B satisfy the relationship of the following Equation 2. When the point C and the point B satisfy the relationship of the following Equation 2, the adhesion of the insulation coating can be further improved. It is conceivable that, as a difference between the Mn standardized optical emission intensity at the point B and the Mn standardized optical emission intensity at the point C becomes larger, that is, as a value on the left side of the following Equation 2 becomes larger, the Mn becomes further rich in the surface layer region.

Mn standardized optical emission intensity at point $B$−Mn standardized optical emission intensity at point $C \geq 0.05$            Equation 2

A distance between the point A and the point B in a depth direction may be 0 to 10.0 μm. Since Mn which becomes rich in the surface layer region is supplied from a region deeper than the point A in a process of forming the intermediate layer, as the distance between the points A and B in the depth direction becomes shorter, a diffusion distance of Mn becomes shorter. Therefore, when the distance between the points A and B in the depth direction is short, Mn tends to be rich in the surface layer region. As a result, the adhesion of the insulation coating can be further improved. In order to promote the concentration of Mn in the surface layer region and to further improve the adhesion of the insulation coating, the distance between the points A and B in the depth direction is preferably 8.0 µm or less, and more preferably 6.0 µm or less.

The distance between the points A and B in the depth direction is expressed by the following Equation 3.

Distance from point $A$ to point $B$ in the depth direction (µm)=depth at point $B$ (µm)-depth at point $A$ (µm)  Equation 3

[Case in which Insulation Coating does not Contain Si]

When the insulation coating does not contain Si, as shown by a solid line in FIG. 3, a peak indicating the intermediate layer is confirmed in the profile for the depth of the Si standardized optical emission intensity. The Si standardized optical emission intensity is a value which enables comparison of analytical values of grain-oriented electrical steel sheets having different Si contents by dividing the optical emission intensity of Si at a specific depth by the average optical emission intensity of Si at a depth of 25 µm to 30 µm in which the composition of the grain-oriented electrical steel sheet is stable and then standardizing it.

When the peak of the Si standardized optical emission intensity is observed in the surface layer region, the relationship of the following Equation 4 may be satisfied. A point D in the following Equation 4 is a point at which the profile (the Si profile) for the depth of the Si standardized optical emission intensity is calculated using the following Equations 2-1 and 2-2 from the optical emission intensity of Si, and the Si standardized optical emission intensity is the local maximum in the surface layer region. When a distance between the point D and the point B in the Mn profile which is the local maximum value of the Mn standardized optical emission intensity in the surface layer region is calculated from the following Equation 4, the distance between points B and D in the depth direction may be 0 µm to 1.0 µm. When the distance between points B and D in the depth direction satisfies the following Equation 4, Mn becomes rich in the vicinity of the interface between the intermediate layer and the base steel sheet, and a bonding force between the intermediate layer and the base steel sheet becomes stronger. Therefore, the adhesion between the intermediate layer and the base steel sheet can be further improved, and as a result, the adhesion of the insulation coating can be further improved.

Depth $d$ µm of each of measurement points=(actual measurement depth after measurement end, unit µm)/(time until measurement end, unit second)× (measurement time of measurement point, unit second)  Equation 2-1

Si standardized optical emission intensity at a depth of $d$ µm=optical emission intensity of Si at a depth of $d$ µm/average optical emission intensity of Si at a depth of 25 µm to 30 µm  Equation 2-2

Distance from point $B$ to point $D$ in depth direction (µm)=depth at point $B$ (µm)-depth at point $D$ (µm)  Equation 4

[Case in which Insulation Coating Contains Si]

Figure 5:
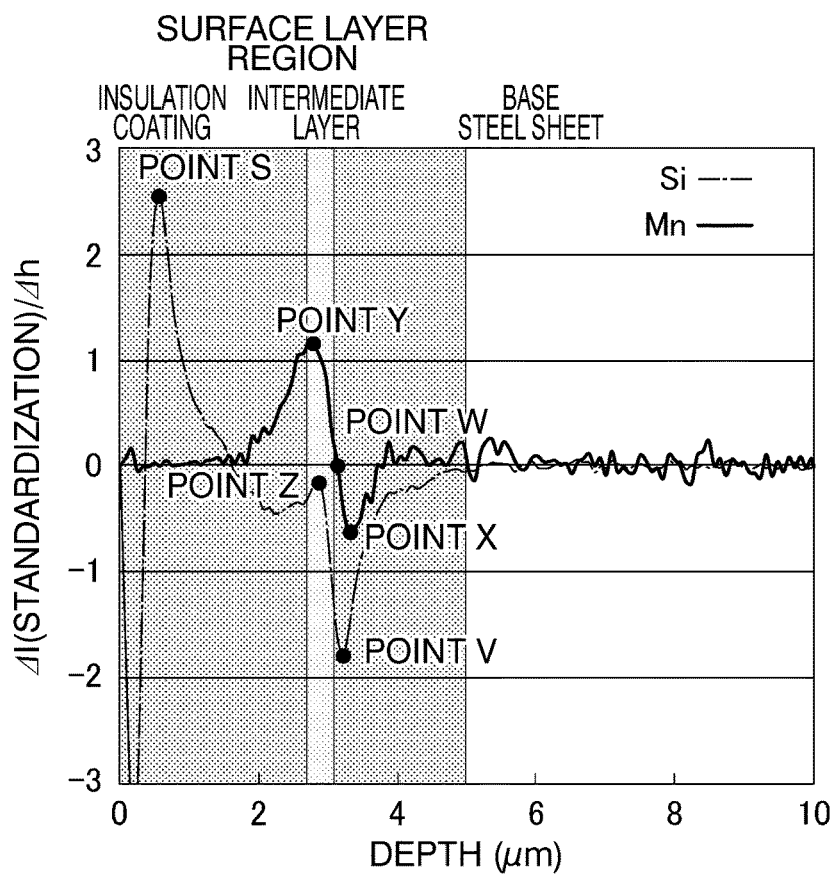
FIG. 5 is a diagram schematically showing a profile for a depth of a Mn difference quotient and a profile for a depth of a Si difference quotient in the grain-oriented electrical steel sheet (Example 14) according to the present embodiment which has the insulation coating containing Si.

When the insulation coating contains Si, as shown by an alternate long and short dash line in FIG. 4, although the interface between the insulation coating and the intermediate layer becomes ambiguous in the profile (the Si profile) for the depth direction of the Si standardized optical emission intensity, there is a portion in which an increase in the Si standardized optical emission intensity (when seen from the base steel sheet side) becomes gradual. In this case, as shown in FIG. 5, when a profile for a depth of a Si difference quotient is calculated from the Si standardized optical emission intensity, it becomes easy to obtain a thickness and a position of the intermediate layer. It is shown as a clearly greatest point Z on the profile for the depth of the Si difference quotient.

The profile for the depth of the Si difference quotient can be obtained using the Si standardized optical emission intensity and the following Equation 5-1.

Si difference quotient at depth of $d$ µm={Si standardized optical emission intensity at depth of $d$ µm-Si standardized optical emission intensity at depth of $(d-h)$ µm}/$h$ µm  Equation 5-1

However, in the above Equation 5-1, h indicates a data sampling interval in the glow-discharge optical emission analysis.

When the insulation coating contains Si, a clear peak of the Si standardized optical emission intensity is not observed in the surface layer region in the Si profile (the profile for the depth of the Si standardized optical emission intensity). However, when a portion in which the increase in the Si standardized optical emission intensity (when seen from the base steel sheet side) becomes gradual is observed, as shown in FIG. 5, in the profile for the depth of the Si difference quotient, the local maximum point S is observed at a certain depth of the insulation coating, and the local maximum point Z of the Si difference quotient is observed at a position deeper than the local maximum point S. In the surface layer region, when a point at which the Si difference quotient is the local minimum and the Si difference quotient is −0.5 or less is defined as a point V in a region in which the Si difference quotient is a negative value, the local maximum point Z is a point at which the Si difference quotient is the local maximum, is present on the surface side of the insulation coating from the point V, and is also closest to the point V.

In the same insulation coating, when a profile for a depth of the Mn difference quotient calculated using the Mn standardized optical emission intensity and the following Equation 5-2 is obtained, as shown in FIG. 5, a point Y at which the Mn difference quotient is the local maximum is observed at a certain depth of the insulation coating, a point X at which the Mn difference quotient is minimum is observed at a position deeper than the point Y, and a point W at which the Mn difference quotient is 0 (zero) is observed in a region from the point Y to the point X.

Mn difference quotient at depth of $d$ µm={Mn standardized optical emission intensity at depth of $d$ µm-Mn standardized optical emission intensity at depth of $(d-h)$ m}/$h$ µm  Equation 5-2

However, in the above Equation 5-2, h indicates a data sampling interval in the glow-discharge optical emission analysis.

In the case in which the insulation coating contains Si, when a point at which the Si difference quotient is the local minimum and the Si difference quotient is −0.5 or less is defined as a point V, and a point at which the Si difference quotient is the local maximum, is present on the surface side of the insulation coating from the point V and is closest to the point V is defined as a point Z in a region in which the Si difference quotient is a negative value in the surface layer region in the profile for the depth of the Si difference quotient, and a point at which the Mn difference quotient is the local maximum is defined as a point Y and a point at which the Mn difference quotient is minimum is defined as a point X in the surface layer region in the profile for the depth of the Mn difference quotient, if a point which is present in a region between points Y and X and at which the Mn difference quotient is 0 (zero) is defined as a point W, a distance between the points W to Z in the depth direction calculated from the following Equation 6 may be 0 μm to 1.0 μm, and the Mn difference quotient at the point Y and the Mn difference quotient at the point X may satisfy the relationship of the following Equation 7.

Distance (μm) between point $W$ and point $Z$ in the depth direction-depth (μm) at point $W$-depth (μm) at point $Z$      Equation 6

Mn difference quotient at point $Y$–Mn difference quotient at point $X$≥0.015      Equation 7

When the profile for the depth of the Mn difference quotient obtained from the Mn standardized optical emission intensity and the profile for the depth of the Si difference quotient obtained from the Si standardized optical emission intensity have the above-described relationship, it shows that a large amount of Mn becomes rich in the surface layer region. As a result, the adhesion of the insulation coating can be further improved.

B. Manufacturing Method of Grain-Oriented Electrical Steel Sheet

Next, a method for manufacturing a grain-oriented electrical steel sheet according to the present embodiment will be described.

The method for manufacturing a grain-oriented electrical steel sheet according to the present embodiment is a method for manufacturing the grain-oriented electrical steel sheet described in the above-described item "A. Grain-oriented electrical steel sheet".

A first embodiment of the method for manufacturing a grain-oriented electrical steel sheet according to the present embodiment (hereinafter, referred to as a manufacturing method of a first embodiment) in which the intermediate layer and the insulation coating are formed in separate processes includes a hot rolling process of heating and then hot-rolling a slab containing Si and Mn to obtain a hot-rolled steel sheet, a hot-band annealing process of performing hot-band annealing on the hot-rolled steel sheet to obtain an annealed steel sheet, and a cold rolling process of cold-rolling the annealed steel sheet once or twice or more with intermediate annealing interposed therebetween to obtain a cold-rolled steel sheet.

Further, the manufacturing method of the first embodiment includes a decarburization annealing process of performing decarburization annealing on the cold-rolled steel sheet to obtain a decarburization-annealed steel sheet, and a final annealing process of obtaining a final-annealed steel sheet by heating the decarburization-annealed steel sheet in a state in which an annealing separator having a MgO content of 10 mass % to 50 mass % is applied on the surface of the decarburization-annealed steel sheet, secondarily recrystallizing the decarburization-annealed steel sheet and then removing the annealing separator on the surface. In this final annealing process, in a cooling process, when a final annealing temperature is 1100° C. or higher, T1 is set to 1100° C., and when the final annealing temperature is less than 1100° C., T1 is set as the final annealing temperature, and cooling in a temperature range of T1 to 500° C. is performed in an atmosphere of an oxidation degree ($P_{H2O}/P_{H2}$) of 0.3 to 100000.

Further, the manufacturing method of the first embodiment includes an intermediate layer forming process of performing thermal oxidation annealing on the final-annealed steel sheet to form an intermediate layer on a surface of the final-annealed steel sheet, and an insulation coating forming process of forming an insulation coating on the intermediate layer. In the cooling process of this insulation coating forming process, cooling in a temperature range of 800° C. to 600° C. is performed in an atmosphere of an oxidation degree ($P_{H2O}/P_{H2}$) of 0.10 to 0.30 for a residence time of 10 seconds to 60 seconds.

A second embodiment of the method for manufacturing a grain-oriented electrical steel sheet according to the present embodiment (hereinafter, referred to as a manufacturing method of a second embodiment) in which the intermediate layer and the insulation coating are simultaneously formed in one process includes a hot rolling process of heating and then hot-rolling a slab containing Si and Mn to obtain a hot-rolled steel sheet, and a hot-band annealing process of performing hot-band annealing on the hot-rolled steel sheet to obtain an annealed steel sheet, and a cold rolling process of cold-rolling the annealed steel sheet once or twice or more with intermediate annealing interposed therebetween to obtain a cold-rolled steel sheet.

Further, the manufacturing method of the second embodiment includes a decarburization annealing process of performing decarburization annealing on the cold-rolled steel sheet to obtain a decarburization-annealed steel sheet, and a final annealing process of obtaining a final-annealed steel sheet by heating the decarburization-annealed steel sheet in a state in which an annealing separator having a MgO content of 10 mass % to 50 mass % is applied on the surface of the decarburization-annealed steel sheet, secondarily recrystallizing the decarburization-annealed steel sheet and then removing the annealing separator on the surface. In this final annealing process, in the cooling process, when the final annealing temperature is 1100° C. or higher, T1 is set to 1100° C., and when the final annealing temperature is less than 1100° C., T1 is set as the final annealing temperature, and cooling in a temperature range of T1 to 500° C. is performed in an atmosphere of an oxidation degree ($P_{H2O}/P_{H2}$) of 0.3 to 100000.

Further, the manufacturing method of the second embodiment includes an intermediate layer and insulation coating forming process of forming an intermediate layer and an insulation coating on a surface of the final-annealed steel sheet in one process. In this intermediate layer and insulation coating forming process, an atmosphere in a temperature range of 800° C. to 1150° C. is set to an oxidation degree ($P_{H2O}/P_{H2}$) of 0.05 to 0.18. Further, in the manufacturing method of the second embodiment, in the cooling process of the intermediate layer and insulation coating forming process, cooling in a temperature range of 800° C. to 600° C. is performed in an atmosphere of an oxidation degree ($P_{H2O}/P_{H2}$) of 0.10 to 0.30 for a residence time of 10 seconds to 60 seconds.

A difference between the manufacturing method of the first embodiment and the manufacturing method of the second embodiment is that the manufacturing method of the first embodiment includes the intermediate layer forming process and the insulation coating forming process, whereas the manufacturing method of the second embodiment includes the intermediate layer and the insulation coating forming process of forming the intermediate layer and the insulation coating in one process.

The manufacturing method of the first embodiment and the manufacturing method of the second embodiment are to prevent the effect of reducing the iron loss due to the insulation coating from being hindered by the unevenness of the interface between the final-annealed film and the base steel sheet and also to ensure the adhesion between the insulation coating and the base steel sheet by forming the intermediate layer. This intermediate layer contains a silicon oxide as a main component and has a Mn-depletion layer having a valley portion of a Mn content. Therefore, in the manufacturing method of the first embodiment, a particularly characteristic process is the intermediate layer forming process and the insulation coating forming process, and a particularly characteristic process in the manufacturing method of the second embodiment is the intermediate layer and the insulation coating forming process.

First, a chemical composition of the slab common to the manufacturing method of the first embodiment and the manufacturing method of the second embodiment will be described.

The chemical composition of the slab may be, for example, in the following range to obtain the chemical composition of the base steel sheet in the general grain-oriented electrical steel sheet in consideration of the content and the like which changes during the manufacturing process from the slab to the grain-oriented electrical steel sheet. Unless otherwise specified, "%" used in the amounts of each of elements in the chemical composition of the slab means mass %. A lower limit value and an upper limit value are included in a numerical limitation range described with "to" interposed therebetween.

Si: 0.80 to 7.00%,
Mn: 0.05% to 1.00%,
C: 0.085% or less,
Acid-soluble Al: 0.010 to 0.065%,
N: 0.0040 to 0.0120%,
Mn: 0.05 to 1.00%,
S and Se: 0.003 to 0.015% in total, and
Remainder: Fe and impurities.
Hereinafter, each of the elements will be described.
Si: 0.80 to 7.00%

Silicon (Si) increases electrical resistance of the grain-oriented electrical steel sheet and reduces the iron loss. When the Si content is less than 0.80%, a γ transformation occurs during the final annealing, and a texture of the grain-oriented electrical steel sheet is impaired.

On the other hand, when the Si content exceeds 7.00%, cold workability is lowered, and cracks are likely to occur during cold rolling. Therefore, the Si content is preferably 0.80 to 7.00%. The Si content is more preferably 2.00% or more, and still more preferably 2.50% or more. The Si content is more preferably 4.50% or less, and still more preferably 4.00% or less.

Mn: 0.05 to 1.00%

Manganese (Mn) combines with S or Se to produce MnS or MnSe and serves as an inhibitor. The secondary recrystallization is stable when the Mn content is in a range of 0.05 to 1.00%. Therefore, the Mn content is preferably 0.05 to 1.00%. The Mn content is preferably 0.06% or more, and more preferably 0.07% or more.

Further, the Mn content is more preferably 0.50% or less, and still more preferably 0.20% or less.

C: 0.085% or Less

Carbon (C) is inevitably contained. Although C is an element effective in controlling a primary recrystallization structure, it adversely affects the magnetic properties. Therefore, the C content is preferably 0.085% or less. The C content is preferably as low as possible.

However, when productivity in the industrial production is considered, the C content is preferably 0.020% or more, and more preferably 0.040% or more.

C is purified in the decarburization annealing process and the final annealing process which will be described later, and the C content becomes 0.005% or less after the final annealing process.

Acid-Soluble Al: 0.010 to 0.065%

The acid-soluble aluminum (Al) combines with N, is precipitated as (Al, Si)N, and serves as an inhibitor. The secondary recrystallization is stable when the acid-soluble Al content is 0.010 to 0.065%. Therefore, the acid-soluble Al content is preferably 0.010 to 0.065%. The acid-soluble Al content is more preferably 0.015% or more, and still more preferably 0.020% or more. From the viewpoint of stability of the secondary recrystallization, the acid-soluble Al content is more preferably 0.045% or less, and still more preferably 0.035% or less.

When the acid-soluble Al remains after final annealing, it forms a compound and deteriorates the iron loss of the grain-oriented electrical steel sheet. Therefore, it is preferable to reduce the acid-soluble Al contained in the steel sheet after the final annealing as much as possible by purification during the final annealing. According to conditions of the final annealing, the steel sheet after the final annealing may not contain the acid-soluble Al.

N: 0.0040 to 0.0120%

Nitrogen (N) combines with Al and serves as an inhibitor. When the N content is less than 0.0040%, a sufficient amount of inhibitor will not be produced. The N content is more preferably 0.0050% or more, and still more preferably 0.0060% or more.

On the other hand, when the N content exceeds 0.0120%, blister which is a kind of defect is likely to occur in the steel sheet. Therefore, the N content is preferably 0.0040 to 0.0120%. The N content is more preferably 0.0110% or less, and still more preferably 0.0100% or less.

N is purified in the final annealing process, and the N content becomes 0.0050% or less after the final annealing process.

S and Se: 0.003 to 0.015% in Total

Sulfur (S) and selenium (Se) combine with Mn to produce MnS or MnSe, and serve as an inhibitor. When total S and Se content is 0.003 to 0.015%, the secondary recrystallization is stable. Therefore, the S and Se content is preferably 0.003 to 0.015% in total.

When S and Se remain after final annealing, they form compounds and deteriorate the iron loss of the grain-oriented electrical steel sheet. Therefore, it is preferable to reduce S and Se contained in the steel sheet after the final annealing as much as possible by purification during the final annealing. According to the conditions of the final annealing, the steel sheet after the final annealing may not contain S and Se.

Here, "the total S and Se content is 0.003 to 0.015%" means that the slab may contain only one of S and Se, and the amount of any one of S and Se may be 0.003 to 0.015%, and also the slab may contain both S and Se, and the total S and Se content may be 0.003 to 0.015%.

The remainder of the chemical composition of the slab used for manufacturing the grain-oriented electrical steel sheet according to the present embodiment is composed of Fe and impurities. The term "impurities" as used herein means elements which are mixed from components contained in raw materials or components mixed in the manufacturing process when the base steel sheet of the grain-oriented electrical steel sheet according to the present embodiment is industrially manufactured and do not substantially adversely affect the effects obtained by the grain-oriented electrical steel sheet according to the present embodiment.

[Optional Element]

The chemical composition of the slab may contain one or more optional elements instead of some of Fe in consideration of enhancement of inhibitor functions due to the compound formation and the influence on the magnetic properties. Examples of the optional element contained in place of some of Fe include the following elements. Since these elements are optional elements and do not have to be contained, a lower limit thereof is 0%.

Bi: 0.010% or less,
B: 0.080% or less,
Ti: 0.015% or less,
Nb: 0.20% or less,
V: 0.15% or less,
Sn: 0.50% or less,
Sb: 0.50% or less,
Cr: 0.30% or less,
Cu: 0.40% or less,
P: 0.50% or less,
Ni: 1.00% or less and
Mo: 0.10% or less.

Hereinafter, the method for manufacturing the grain-oriented electrical steel sheet according to the present embodiment will be described separately for the manufacturing method of the first embodiment and the manufacturing method of the second embodiment.

In the following, the conditions in the processes other than the above-described particularly characteristic processes (the intermediate layer forming process, the insulation coating forming process, and the intermediate layer and insulation coating forming process) are shown by taking general conditions as an example. Therefore, even when the general conditions are not satisfied, it is possible to obtain the effects of the grain-oriented electrical steel sheet according to the present embodiment. As described above, the difference between the manufacturing method of the first embodiment and the manufacturing method of the second embodiment is that the manufacturing method of the first embodiment includes the intermediate layer forming process and the insulation coating forming process, whereas the manufacturing method of the second embodiment includes the intermediate layer and the insulation coating forming process of forming the intermediate layer and the insulation coating in one process.

B-1. Manufacturing Method of First Embodiment 1.1. Hot Rolling Process

In the hot rolling process, the slab having the above-described chemical composition is heated in a temperature range of 800° C. to 1300° C. and is then hot-rolled to obtain a hot-rolled steel sheet. The slab is obtained, for example, by melting steel having the above-described chemical composition of the slab in a converter, an electric furnace, or the like, performing vacuum degassing if necessary, and then performing continuous casting or blooming after ingot making. A thickness of the slab is not particularly limited, but is, for example, 150 mm to 350 mm, and preferably 220 mm to 280 mm. Further, a slab having a thickness of about 10 mm to 70 mm (so-called a "thin slab") may be used. When the thin slab is used, rough rolling before final rolling can be omitted in the hot rolling process.

It is preferable to set the heating temperature of the slab to 1200° C. or lower because it is possible to avoid various problems (a dedicated heating furnace is required, a large amount of melt scale, and the like), for example, when the slab is heated at a temperature higher than 1200° C.

When the heating temperature of the slab is too low, hot rolling may become difficult, and the productivity may decrease. Therefore, the heating temperature of the slab is preferably 950° C. or higher. It is also possible to omit the slab heating process itself and to start hot rolling after casting until the temperature of the slab decreases.

A heating time of the slab may be 40 minutes to 180 minutes.

In the hot rolling process, the slab after heating is roughly rolled and is then final-rolled to obtain a hot-rolled steel sheet having a predetermined thickness. A final temperature in the hot rolling process (a temperature of the steel sheet on the outlet side of a final rolling stand which finally rolls the steel sheet in a final rolling mill) is, for example, 900° C. to 1000° C. After the final rolling is completed, the hot-rolled steel sheet is coiled at a predetermined temperature.

A sheet thickness of the hot-rolled steel sheet is not particularly limited, but is preferably 3.5 mm or less, for example.

2. Hot-Band Annealing Process

In the hot-band annealing process, the hot-rolled steel sheet is subjected to hot-band annealing to obtain an annealed steel sheet. Although conditions of the hot-band annealing may be general conditions, and preferably, an annealing temperature thereof (a furnace temperature in a hot-band annealing furnace) is 750° C. to 1200° C. and an annealing time (a staying time in the hot-band annealing furnace) is 30 seconds to 600 seconds, for example. The annealed steel sheet is held under the above-described conditions and then may be rapidly cooled.

3. Cold Rolling Process

In the cold rolling process, the annealed steel sheet is cold-rolled once or twice or more with intermediate annealing interposed therebetween to obtain a cold-rolled steel sheet. The annealed steel sheet may be pickled before the cold-rolling is performed on the annealed steel sheet.

When a plurality of cold rolling processes are carried out without performing an intermediate annealing process, it may be difficult to obtain uniform characteristics in the manufactured grain-oriented electrical steel sheet. On the other hand, when the plurality of the cold rolling processes are carried out and the intermediate annealing process is carried out between the cold rolling processes, the magnetic flux density may be low in the manufactured grain-oriented electrical steel sheet. Therefore, the number of cold rolling processes and the presence or absence of the intermediate annealing process are determined according to characteristics and manufacturing cost required for the grain-oriented electrical steel sheet to be finally manufactured.

A cold rolling ratio (a final cold rolling reduction) in final cold rolling in one or twice or more cold rolling is not particularly limited, but from the viewpoint of texture control, it is preferably 80% or more, and more preferably 90% or more.

The cold-rolled steel sheet obtained by the cold rolling process is wound in a coil shape. A sheet thickness of the cold-rolled steel sheet is not particularly limited, but is preferably 0.35 mm or less, and more preferably 0.30 mm or less to further reduce the iron loss of the grain-oriented electrical steel sheet.

4. Decarburization Annealing Process

In the decarburization annealing process, the cold-rolled steel sheet is decarburization-annealed to obtain a decarburization-annealed steel sheet. Specifically, primary recrystallization occurs in the cold-rolled steel sheet by performing decarburization annealing, and C contained in the cold-rolled steel sheet is removed. The decarburization annealing is preferably performed in a moist atmosphere containing hydrogen and nitrogen to remove C. Conditions of the decarburization annealing are preferably, for example, a decarburization annealing temperature (a temperature of a furnace in which decarburization annealing is performed) of 800° C. to 950° C., and a decarburization annealing time of 30 seconds to 120 seconds.

5. Final Annealing Process

In the final annealing process, final annealing in which the decarburization-annealed steel sheet is heated in a state in which the annealing separator is applied thereto is performed. As a result, the secondary recrystallization occurs in the decarburization-annealed steel sheet.

In a general method for manufacturing a grain-oriented electrical steel sheet, an annealing separator having a high magnesia concentration (for example, MgO≥90 mass %) is applied to a surface of the decarburization-annealed steel sheet, and then final annealing is performed to form a final-annealed film containing a forsterite ($Mg_2SiO_4$) as a main component. Generally, the annealing separator is applied to prevent seizure between the steel sheets after final annealing and also to form a final-annealed film made of a forsterite ($Mg_2SiO_4$).

On the other hand, in the final annealing process of the manufacturing method of the first embodiment, final annealing in which the decarburization-annealed steel sheet is heated in a state in which an annealing separator having a low magnesia concentration (for example, MgO: 10 mass % to 50 mass %, $Al_2O_3$: 50 mass % to 90 mass %) is applied on the surface of the decarburization-annealed steel sheet is performed. Then, a final-annealed steel sheet is obtained by removing the annealing separator. Since the annealing separator having a low magnesia concentration is used in this final annealing process, an intermediate layer can be formed without forming the final-annealed film made of a forsterite ($Mg_2SiO_4$). Further, the MgO content in the annealing separator is preferably 15 mass % or more, and more preferably 20 mass % or more. Further, the MgO content in the annealing separator is preferably 45 mass % or less, and more preferably 40 mass % or less.

The heating conditions for the final annealing may be general conditions, and, for example, a heating rate to a final annealing temperature may be 5° C./h to 100° C./h, a final annealing temperature (a temperature of a furnace in which the final annealing is performed) may be 1000° C. to 1300° C., and a final annealing time (a holding time at the final annealing temperature) may be 10 hours to 50 hours. In the manufacturing method of the first embodiment, in the cooling process after the final annealing temperature of 1000° C. to 1300° C. is held for 10 hours to 50 hours, the oxidation degree ($P_{H2O}/P_{H2}$) of the atmosphere in a predetermined temperature range is controlled to 0.3 to 100000. When the final annealing temperature is 1100° C. or higher, T1 is set to 1100° C., and when the final annealing temperature is less than 1100° C., T1 is set as the final annealing temperature, and the temperature range for controlling the oxidation degree of the atmosphere is the temperature range of T1 to 500° C. Deficiency of Mn in a surface layer portion of the final-annealed steel sheet can be curbed by the final annealing.

A method for removing the annealing separator is not particularly limited, and examples thereof may include rubbing the surface of the final-annealed steel sheet with a brush, and the like.

6. Intermediate Layer Forming Process

In the intermediate layer forming process, thermal oxidation annealing is performed on the final-annealed steel sheet. Thus, an intermediate layer containing a silicon oxide as a main component is formed on the surface of the final-annealed steel sheet.

The intermediate layer is preferably formed to have the thickness (2 nm to 400 nm) described in the item of "A. Grain-oriented electrical steel sheet 1-1. Intermediate layer" described above.

The conditions for thermal oxidation annealing in the intermediate layer forming process are not particularly limited, but are preferably the following conditions, for example.

Thermal oxidation annealing temperature (a temperature of a furnace in which thermal oxidation annealing is performed): 600° C. to 1150° C.

Thermal oxidation annealing time (a residence time in the furnace in which thermal oxidation annealing is performed): 10 seconds to 60 seconds Oxidation degree of atmosphere ($P_{H2O}/P_{H2}$): 0.0005 to 0.2

The thermal oxidation annealing temperature is preferably 650° C. or higher from the viewpoint of a reaction rate. More preferably, it is 700° C. or higher. However, when the thermal oxidation annealing temperature exceeds 1150° C., it may become difficult to keep a formation reaction of the intermediate layer uniform, the unevenness of the interface between the intermediate layer and the base steel sheet may become large, and the iron loss of the grain-oriented electrical steel sheet may deteriorate. In addition, since the strength of the grain-oriented electrical steel sheet decreases, and thus it is difficult to process it in a continuous annealing furnace, the productivity may decrease. Therefore, the thermal oxidation annealing temperature is preferably 1150° C. or lower. More preferably, it is 1100° C. or lower.

The thermal oxidation annealing time is preferably 10 seconds or more from the viewpoint of the formation of the intermediate layer. Further, in order to avoid a decrease in a productivity and a space factor due to the increase in the thickness of the intermediate layer, it is preferably 60 seconds or less.

From the viewpoint of forming the intermediate layer to have a thickness of 2 to 400 nm, the thermal oxidation annealing is preferably held in a temperature range of 650° C. to 1000° C. for 15 seconds to 60 seconds, and more preferably held in a temperature range of 700° C. to 900° C. for 25 seconds to 60 seconds.

The oxidation degree ($P_{H2O}/P_{H2}$) of the atmosphere in which thermal oxidation annealing is performed is preferably 0.0005 to 0.2.

7. Insulation Coating Forming Process

In the insulation coating forming process, the insulation coating is formed on the surface of the intermediate layer by applying a coating solution to the surface of the intermediate layer, baking it and then heating it in a mixed atmosphere of nitrogen and hydrogen gas.

The insulation coating is preferably formed to have the thickness (0.1 μm to 10 μm) described in the item of "A. Grain-oriented electrical steel sheet 1-2. Insulation coating" described above.

The coating solution is not particularly limited, but a coating solution containing colloidal silica and a coating solution containing no colloidal silica can be used properly according to the use. When the insulation coating is formed using the coating solution containing colloidal silica, an insulation coating containing Si can be formed. Further, when the insulation coating is formed using the coating solution containing no colloidal silica, the insulation coating containing no Si can be formed.

Examples of the coating solution containing no colloidal silica include a coating solution containing a boric acid and an alumina sol.

Further, examples of the coating solution containing colloidal silica include a coating solution containing a phosphoric acid or a phosphate, colloidal silica, and a chromic anhydride or a chromate. Examples of the phosphate include a phosphate such as Ca, Al, Mg and Sr. Examples of the chromate include a chromate such as Na, K, Ca, and Sr. The colloidal silica is not particularly limited, and a particle size thereof can be appropriately used.

Various elements and compounds may be further added to the coating solution to improve various characteristics as long as the effects of the grain-oriented electrical steel sheet according to the present embodiment are not lost.

In the insulation coating forming process, it is preferable to heat-treat the final-annealed steel sheet on which the intermediate layer is formed under the following conditions.

Oxidation degree of atmosphere ($P_{H2O}/P_{H2}$): 0.001 to 0.1
Holding temperature: 800° C. to 1150° C.
Holding time: 10 seconds to 30 seconds When the holding temperature is less than 800° C., a good insulation coating may not be formed according to the type of insulation coating. When the holding temperature exceeds 1150° C., or the oxidation degree of the atmosphere is less than 0.001, the insulation coating may decompose. Further, when the oxidation degree of the atmosphere exceeds 0.1, the base steel sheet may be significantly oxidized and the iron loss of the grain-oriented electrical steel sheet may deteriorate. The oxidation degree of the atmosphere ($P_{H2O}/P_{H2}$) is preferably 0.02 or more, and more preferably 0.05 or more. The oxidation degree of the atmosphere ($P_{H2O}/P_{H2}$) is preferably 0.09 or less, and more preferably 0.07 or less.

A gas in the atmosphere may be any generally used gas, and for example, a gas composed of hydrogen of 25 volume % and remainder of nitrogen and impurities can be used.

After the heat treatment as described above, the final-annealed steel sheet is cooled. The oxidation degree of the atmosphere and the cooling history in this cooling process are important conditions for forming a suitable Mn distribution in the surface layer region. In the cooling process of the insulation coating forming process, cooling in the temperature range of 800° C. to 600° C. is performed in an atmosphere of an oxidation degree ($P_{H2O}/P_{H2}$) of 0.10 to 0.30 for a residence time of 10 seconds to 60 seconds. The residence time is preferably 25 seconds or less in consideration of the productivity. The residence time referred to here is a time from when a surface temperature of the final-annealed steel sheet reaches 800° C. to when the surface temperature of the final-annealed steel sheet reaches 600° C. in the cooling process of the insulation coating forming process.

Mn can become rich and unevenly distributed at a certain depth in the surface layer region by performing the above-described cooling. Although the reason for this is not clear, the present inventors consider that this is because Mn atoms are diffused and supplied from the inside of the base steel sheet to the surface layer region in an atmosphere of a relatively high oxidation degree ($P_{H2O}/P_{H2}$) of 0.10 to 0.30, and Mn atoms become rich at the interface between the base steel sheet and the intermediate layer in the temperature range of 600° C. to 800° C.

A range in which the Mn atoms can be diffused under the above-described conditions is about 5 μm. In the manufacturing method of the related art in which the deficiency of Mn in the surface layer portion of the final-annealed steel sheet is not suppressed in the final annealing process, a sufficient amount of Mn cannot reach in the vicinity of the interface between the base steel sheet and the intermediate layer due to diffusion. Thus, it is considered that Mn cannot become rich and unevenly distributed in the vicinity of the interface between the base steel sheet and the intermediate layer in the manufacturing method of the related art. As a result, it is considered that the Mn-depletion layer having the valley portion of the Mn content cannot be formed, and the Mn-rich layer having the peak portion of the Mn content cannot be formed in the surface layer region of the grain-oriented electrical steel sheet.

8. Other Processes

The manufacturing method of the first embodiment may further include processes generally performed in the method for manufacturing the grain-oriented electrical steel sheet. A nitriding treatment process of performing a nitriding treatment to increase the N content of the decarburization-annealed steel sheet may be further provided between the start of the decarburization annealing and the development of the secondary recrystallization in the final annealing. This is because the magnetic flux density of the grain-oriented electrical steel sheet can be stably improved even when a temperature gradient provided to the steel sheet at a boundary portion between a primary recrystallization region and a secondary recrystallization region is low. The nitriding process may be a general process, and may be, for example, a process of performing annealing in an atmosphere containing a gas having a nitriding capability such as ammonia, a process of final-annealing the decarburization-annealed steel sheet to which an annealing separator containing a powder having a nitriding capability such as MnN is applied, or the like.

B-2. Manufacturing Method of Second Embodiment

In the manufacturing method of the second embodiment, the process of forming the intermediate layer and the process of forming the insulation coating in the manufacturing method of the first embodiment are performed in one process. There is no difference from the manufacturing method of the first embodiment except that the intermediate layer and the insulation coating are formed in one process. Therefore, only the intermediate layer and the insulation coating forming process of forming the intermediate layer and the insulation coating in one process will be described below.

1. Intermediate Layer and Insulation Coating Forming Process

In order to simultaneously perform the formation of the intermediate layer and the insulation coating by thermal oxidation during the baking of the coating solution, preferably, the heating temperature is in a temperature range of 800° C. to 1150° C., and the atmosphere of oxidation degree ($P_{H2O}/P_{H2}$) is 0.05 to 0.18. The holding time in the temperature range of 800° C. to 1150° C. may be 10 seconds to 120 seconds. The oxidation degree of the atmosphere is preferably 0.10 to 0.15.

The coating solution and the gas in the atmosphere may be the same as in the manufacturing method of the first embodiment.

After the heat treatment as described above, the final-annealed steel sheet is cooled. The conditions of the cooling process are the same as those in the cooling process of the insulation coating forming process of the first embodiment. Specifically, in the cooling process of the intermediate layer and the insulation coating forming process, cooling in the temperature range of 800° C. to 600° C. is performed in an atmosphere of an oxidation degree ($P_{H2O}/P_{H2}$) of 0.10 to 0.30 for a residence time of 10 seconds to 60 seconds. The residence time is preferably 25 seconds or less in consideration of the productivity. The residence time referred to here is a time from the time when the surface temperature of the final-annealed steel sheet reaches 800° C. to the time when the surface temperature of the final-annealed steel sheet reaches 600° C. in the cooling process of the intermediate layer and the insulation coating forming process.

In the manufacturing method of the second embodiment, the intermediate layer is formed on the surface of the base steel sheet, and the insulation coating is also formed on the surface of the intermediate layer by performing the above-described final annealing process (similar to the final annealing process of the manufacturing method of the first embodiment) and the intermediate layer and insulation coating forming process. Further, it is possible to form the Mn-depletion layer having the valley portion of the Mn content and the Mn-rich layer having the peak portion of the Mn content.

The present invention is not limited to the above-described embodiment. The above-described embodiment is an example, and those having substantially the same configuration as the technical idea described in the claims of the present invention and exhibiting the same operational effects are included in the technical scope of the present invention.

EXAMPLES

Hereinafter, the present invention will be specifically described with reference to Examples and Comparative examples. In the following, conditions in the examples are one condition example adopted for confirming the feasibility and effects of the present invention, and the present invention is not limited to this one condition example. In the present invention, various conditions can be adopted as long as the gist of the present invention is not deviated and the object of the present invention is achieved.

1. Test Method (Observation of Coating Structure)

Regarding the coating structure of the grain-oriented electrical steel sheet, a cross section of a coating was observed with a transmission electron microscope (TEM), and a state of the intermediate layer and the insulation coating (the entire insulation coating) was observed.

A test piece having a cross section perpendicular to a rolling direction was taken from the grain-oriented electrical steel sheet, and the cross section was observed using a scanning electron microscope (SEM). A region having a depth of 10 μm from the surface of the steel sheet was observed in a range of 100 μm in a direction parallel to the surface of the steel sheet with a magnification of 10000 times. Thus, a number density of an oxide having a circle-equivalent diameter of 0.1 μm or more was measured in a region having a depth of 10 μm from the surface of the base steel sheet toward the inside of the base steel sheet.

In Examples 1 to 20 which will be described later, the number density of the oxide having the circle-equivalent diameter of 0.1 μm or more was 0.020 pieces/μm² or less in the region having the depth of 10 μm from the surface of the base steel sheet toward the inside of the base steel sheet. That is, in these examples, the final-annealed film was substantially not present on the surface of the base steel sheet.

In the observation of the cross-section by the transmission electron microscope (TEM) with respect to Examples 1 to 20 which will be described later, it was also confirmed by an electron diffraction pattern and an energy dispersive X-ray analysis (EDX) that the composition of the intermediate layer was such that the Fe content was less than 30 atomic %, the P content was less than 5 atomic %, the Si content was 20 atomic % or more and less than 50 atomic %, the O content was 50 atomic % or more and less than 80 atomic %, and the Mg content was 10 atomic % or less. Furthermore, it was also confirmed that the thickness of the intermediate layer was 2 nm to 400 nm and the thickness of the insulation coating was 0.1 μm to 10 μm.

(Analysis of Optical Emission Intensity of Mn and Si)

The optical emission intensity of Mn and the optical emission intensity of Si by the glow-discharge optical emission analysis were measured from the surface of the grain-oriented electrical steel sheet with a measurement diameter of 3 mm in the sheet thickness direction using GDA750 manufactured by Rigaku Corporation. The profile for the depth of the Mn standardized optical emission intensity (the Mn profile), the profile for the depth of the Mn difference quotient, the profile for the depth of the Si standardized optical emission intensity (the Si profile), and the profile for the depth of Si difference quotient were obtained from the obtained Mn optical emission intensity and Si optical emission intensity. A depth of the point A, a depth of the point B, an Mn standardized optical emission intensity at the point B, a distance between the point B to the point C in the depth direction, a distance between the point A and the point B in the depth direction, a distance between the point B and the point D in the depth direction, a distance between the point W and the point Z in the depth direction, and a distance between the point Y and the point X in the depth direction were obtained from these profiles. These values were calculated using the above-described equations.

In Comparative examples, although the point B at which the Mn standardized optical emission intensity is 0.50 or more and is also the local maximum is not present in the surface layer region of the grain-oriented electrical steel sheet (because the Mn standardized optical emission intensity of the local maximum point was less than 0.50), the local maximum point in the surface layer region is tentatively defined as the point B, and the depth of the point B and the like are described in Tables.

(Adhesion Test of Insulation Coating)

An adhesion test of the insulation coating was carried out according to a bending resistance test of JIS K 5600-5-1 (1999). A test piece of 80 mm in the rolling direction and 40 mm in a direction perpendicular to the rolling direction was collected from the grain-oriented electrical steel sheet. The collected test piece was coiled around a mandrel having a diameter of 16 mm. For the adhesion test, 180° bending was performed using a test device of a type 1 described in the bending resistance test of JIS K 5600-5-1 (1999). An area ratio of a portion on which the insulation coating remained was measured on a bent inner surface of the test piece after bending. When a residual ratio of the insulation coating was 40% or more, it was determined to be acceptable as having excellent adhesion. When the residual ratio of the insulation coating was less than 40%, it was determined to be unacceptable as having poor adhesion.

(Analysis of Chemical Composition)

The chemical composition of the base steel sheet was measured using a spark optical mechanism spectroscopy (Spark-OES). Further, when the content was very small, it was measured using an inductively coupled plasma-mass spectrometry (ICP-MS) as needed. The acid-soluble Al was measured by the ICP-MS using a filtrate obtained by heat-decomposing a sample with an acid. Further, C and S were measured using a combustion-infrared absorption method, and N was measured using an inert gas melting-thermal conductivity method.

The base steel sheets of Examples 1 to 16 which will be described later contain Si of 0.80% to 7.00%, Mn of 0.05% to 1.00%, C of 0.005% or less, and N: 0.0050% or less, and the remainder thereof is composed of Fe and impurities.

2. Experimental Examples of Grain-Oriented Electrical Steel Sheet Having Insulation Coating Containing No Si (Examples 1 to 8 and Comparative Examples 1 to 4 in Table 1)

Examples 1 to 8 and Comparative examples 1 to 4 in Table 1 are experimental examples of grain-oriented electrical steel sheets having an insulation coating containing no Si. Among the experimental examples, Examples 1 to 4, Examples 7 and 8 and Comparative examples 1 to 4 are experimental examples in which the formation of the intermediate layer and the formation of the insulation coating are carried out in one process (experimental examples of the manufacturing method of the second embodiment), and Examples 5 and 6 are experimental examples in which the formation of the intermediate layer and the formation of the insulation coating are carried out in separate processes (experimental examples of the manufacturing method of the first embodiment).

Example 1

A slab having a chemical composition containing Si of 3.30%, C of 0.050%, acid-soluble Al of 0.030%, N of 0.008%, Mn of 0.10%, and S and Se of 0.005% in total and containing Fe and impurities as the remainder was used. After the slab is soaked at 1150° C. for 60 minutes, the slab after heating was hot-rolled to obtain a hot-rolled steel sheet having a sheet thickness of 2.8 mm (the hot-rolling process). Next, the hot-rolled steel sheet was subjected to hot-band annealing to be held at 900° C. for 120 seconds and then rapidly cooled to obtain an annealed steel sheet (the hot-band annealing process). Next, the annealed steel sheet was pickled and then cold-rolled to obtain a cold-rolled steel sheet having a final thickness of 0.23 mm (the cold rolling process).

The obtained cold-rolled steel sheet was subjected to decarburization annealing in an atmosphere composed of hydrogen of 75 volume %, and the remainder of nitrogen and impurities at 850° C. for 90 seconds to obtain a decarburization-annealed steel sheet (the decarburization annealing process).

An annealing separator having a composition of $Al_2O_3$ of 60 mass % and MgO of 40 mass % was applied to the obtained decarburization-annealed steel sheet. Next, final annealing was performed, in which it was heated to 1200° C. at a heating rate of 15° C./h in a hydrogen-nitrogen mixed atmosphere and then held at 1200° C. for 20 hours in a hydrogen atmosphere.

Then, in the cooling process, it was cooled from 1100° C. to 500° C. for 10 hours in an atmosphere of an oxidation degree ($P_{H2O}/P_{H2}$) of 1000. After the cooling, the annealing separator was removed from the surface using a brush to obtain a final-annealed steel sheet in which the secondary recrystallization was completed (the final annealing process).

The final-annealed steel sheet was heat-treated at 800° C. to form the intermediate layer and the insulation coating at the same time (the intermediate layer and insulation coating forming process). Specifically, a coating solution containing a boric acid and an alumina sol (a coating solution containing no colloidal silica) was applied to the surface of the obtained final-annealed steel sheet, and a heat treatment was carried out at a heating temperature of 800° C. for a holding time of 60 seconds in an atmosphere of an oxidation degree ($P_{H2O}/P_{H2}$) of 0.1 which was composed of hydrogen, water steam and nitrogen. After this heat treatment, cooling in the temperature range from 800° C. to 600° C. was performed in an atmosphere of an oxidation degree of 0.10. Thus, the intermediate layer containing a silicon oxide as a main component was formed on the surface of the final-annealed steel sheet, and at the same time, the insulation coating containing a boric acid and alumina as main components was formed on the surface of the intermediate layer. The residence time at 800° C. to 600° C. was 10 seconds to 60 seconds.

The grain-oriented electrical steel sheet of Example 1 was obtained by the above-described method.

Examples 2 to 4

The grain-oriented electrical steel sheets of Examples 2 to 4 were obtained by the same method as in Example 1 except that the oxidation degree in the cooling process of the intermediate layer and the insulation coating forming process was changed to conditions shown in Table 1.

Examples 5 and 6

In Examples 5 and 6, the formation of the intermediate layer and the formation of the insulation coating were carried out in separate processes. Specifically, the intermediate layer was formed by heating the final-annealed steel sheet obtained by the same method as in Example 1 to 870° C. and holding for 60 seconds in an atmosphere of an oxidation degree ($P_{H2O}/P_{H2}$) of 0.01. Next, a coating solution containing a boric acid and an alumina sol (a coating solution containing no colloidal silica) was applied to the final-annealed steel sheet on which the intermediate layer was formed, and the steel sheet was heated to 800° C. in an atmosphere of an oxidation degree ($P_{H2O}/P_{H2}$) of 0.1. The heated final-annealed steel sheet was held at 800° C. for 30 seconds to bake the insulation coating and then cooled to 600° C. in the atmosphere described in the "oxidation degree in cooling process of intermediate layer and insulation coating forming process" in Table 1 (for Examples 5 and 6, it is actually the "oxidation degree in cooling process of insulation coating forming process"). The residence time at 800° C. to 600° C. was 10 seconds to 60 seconds.

Examples 7 and 8

The grain-oriented electrical steel sheets of Examples 7 and 8 were obtained by the same method as in Example 1 except that the oxidation degree in the cooling process of the final annealing process, the oxidation degree in the cooling process of the intermediate layer and insulation coating forming process, the heating temperature during the formation of the intermediate layer, and the oxidation degree in the cooling process of the intermediate layer and the insulation coating forming process were changed to the conditions shown in Table 1.

Comparative Examples 1 to 4

The grain-oriented electrical steel sheets of Comparative examples 1 to 4 were obtained by the same method as in Example 1 except that the oxidation degree in the cooling process of the final annealing process, the oxidation degree in the cooling process of the intermediate layer and insulation coating forming process, the heating temperature during the formation of the intermediate layer, and the oxidation degree in the cooling process of the intermediate layer and the insulation coating forming process were changed to the conditions shown in Table 1.

3. Experimental Examples of Grain-Oriented Electrical Steel Sheets Having an Insulation Coating Containing Si (Examples 9 to 16 and Comparative Examples 5 to 8 in Table 2)

Examples 9 to 16 and Comparative examples 5 to 8 in Table 2 are experimental examples of grain-oriented electrical steel sheets having an insulation coating containing Si. Among the experimental examples, Examples 9 to 12, Examples 15 and 16 and Comparative Examples 5 to 8 are experimental examples in which the formation of the intermediate layer and the formation of the insulation coating are carried out in one process (experimental examples of the manufacturing method of the second embodiment), and Examples 13 and 14 are experimental examples in which the formation of the intermediate layer and the formation of the insulation coating are carried out in separate processes (experimental examples of the manufacturing method of the first embodiment).

Example 9

The grain-oriented electrical steel sheet of Example 9 was manufactured by the same method as in Example 1 except that the composition of the coating solution applied to the final-annealed steel sheet was changed. A coating solution containing Al phosphate, colloidal silica and chromic anhydride was used as the coating solution.

Examples 10 to 12

The grain-oriented electrical steel sheets of Examples 10 to 12 were obtained by the same method as in Example 9 except that the oxidation degree in the cooling process of the intermediate layer and the insulation coating forming process was changed to the conditions shown in Table 2.

Examples 13 and 14

In Examples 13 and 14, the formation of the intermediate layer and the formation of the insulation coating were carried out in separate processes. Specifically, the intermediate layer was formed by heating the final-annealed steel sheet obtained by the same method as in Example 9 to 870° C. and holding for 60 seconds in an atmosphere of the oxidation degree ($P_{H2O}/P_{H2}$) of 0.01. Next, the coating solution containing Al phosphate, colloidal silica and chromic anhydride was applied to the final-annealed steel sheet on which the intermediate layer was formed, and the steel sheet was heated to 800° C. in the atmosphere of the oxidation degree ($P_{H2O}/P_{H2}$) of 0.1. The heated steel sheet was held at the temperature for 30 seconds to bake the insulation coating and is then cooled to 600° C. in the atmosphere described in the "oxidation degree in cooling process of intermediate layer and insulation coating forming process" in Table 2 (for Examples 13 and 14, it is actually the "oxidation degree in cooling process of insulation coating forming process"). The residence time at 800° C. to 600° C. was 10 seconds to 60 seconds.

Examples 15 and 16

The grain-oriented electrical steel sheets of Examples 15 and 16 were obtained by the same method as in Example 9 except that the oxidation degree in the cooling process of the final annealing process, the oxidation degree in the cooling process of the intermediate layer and insulation coating forming process, the heating temperature during the formation of the intermediate layer, and the oxidation degree in the cooling process of the intermediate layer and the insulation coating forming process were changed to the conditions shown in Table 2.

Comparative Examples 5 to 8

The grain-oriented electrical steel sheets of Comparative examples 5 to 8 were obtained by the same method as in Example 9 except that the oxidation degree in the cooling process of the final annealing process, the oxidation degree in the cooling process of the intermediate layer and insulation coating forming process, the heating temperature during the formation of the intermediate layer, and the oxidation degree in the cooling process of the intermediate layer and the insulation coating forming process were changed to the conditions shown in Table 2.

(Evaluation Results)

Evaluation results are summarized in Table 1 and Table 2. For Examples 5 and 6 in Table 1 and Examples 13 and 14 in Table 2, the "oxidation degree in cooling process of insulation coating forming process" is described in the column of the "oxidation degree in cooling process of intermediate layer and insulation coating forming process".

Further, FIG. 2 shows the profile (the Mn profile) for the depth of the Mn standardized optical emission intensity (of the grain-oriented electrical steel sheet having an insulation coating containing no Si) of Example 1, FIG. 4 shows the profile (the Mn profile) for the depth of the Mn standardized optical emission intensity and the profile (the Si profile) for the depth of the Si standardized optical emission intensity (of the grain-oriented electrical steel sheet having an insulation coating containing Si) of Example 14, and FIG. 5 shows the profile for the depth of the Mn difference quotient and the profile for the depth of the Si difference quotient (of the grain-oriented electrical steel sheet having an insulation coating containing Si) of Example 14.

TABLE 1

Experimental example of insulation coating containing no Si

| Experimental example | Oxidation degree in cooling process of final annealing process | Oxidation degree when intermediate layer is formed | Heating temperature when intermediate layer is formed | Oxidation degree in cooling process of intermediate layer and insulation coating forming process | Point A Depth (μm) | Depth (μm) | Point B Mn standardized optical emission intensity | Mn standardized optical emission intensity difference between point B and point C | Distance between point A and point B (μm) | Distance between point B and point D (μm) | Insulation film residual rate after bending Φ16 mm (%) |
|---|---|---|---|---|---|---|---|---|---|---|---|
| Example 1 | 1000 | 0.1 | 800° C. | 0.10 | 19.8 | 4.2 | 0.61 | 0.02 | 15.6 | 1.2 | 44 |
| Example 2 | 1000 | 0.1 | 800° C. | 0.15 | 14.8 | 4.5 | 0.55 | 0.23 | 10.3 | 1.3 | 56 |
| Example 3 | 1000 | 0.1 | 800° C. | 0.20 | 11.2 | 6.1 | 0.69 | 0.17 | 5.1 | 0.6 | 69 |
| Example 4 | 1000 | 0.1 | 800° C. | 0.30 | 16.3 | 5.8 | 0.80 | 0.27 | 10.5 | 1.1 | 50 |
| Example 5 | 1000 | 0.01 | 870° C. | 0.15 | 10.1 | 3.2 | 0.99 | 0.22 | 6.9 | 1.1 | 55 |

TABLE 1-continued

Experimental example of insulation coating containing no Si

| Experimental example | Oxidation degree in cooling process of final annealing process | Oxidation degree when intermediate layer is formed | Heating temperature when intermediate layer is formed | Oxidation degree in cooling process of intermediate layer and insulation coating forming process | Point A Depth (μm) | Point B Depth (μm) | Point B Mn standardized optical emission intensity | Mn standardized optical emission intensity difference between point B and point C | Distance between point A and point B (μm) | Distance between point B and point D (μm) | Insulation film residual rate after bending Φ16 mm (%) |
|---|---|---|---|---|---|---|---|---|---|---|---|
| Example 6 | 1000 | 0.01 | 870° C. | 0.20 | 6.4 | 4.4 | 0.85 | 0.40 | 2.0 | 0.2 | 90 |
| Example 7 | 0.3 | 0.01 | 870° C. | 0.20 | 8.9 | 5.3 | 1.00 | 0.30 | 3.6 | 0.1 | 78 |
| Example 8 | 50000 | 0.01 | 870° C. | 0.20 | 12.5 | 5.7 | 0.77 | 0.22 | 6.8 | 0.3 | 71 |
| Comparative example 1 | 1000 | 0.1 | 800° C. | 0.05 | 14.1 | 4.5 | 0.21 | 0.04 | 9.6 | 2.6 | 13 |
| Comparative example 2 | 1000 | 0.1 | 870° C. | 0.40 | 19.1 | 8.1 | 0.20 | 0.02 | 11.0 | 2.9 | 11 |
| Comparative example 3 | 0.2 | 0.1 | 870° C. | 0.20 | 18.9 | 7.1 | 0.38 | 0.02 | 11.8 | 3.9 | 16 |
| Comparative example 4 | 150000 | 0.1 | 870° C. | 0.20 | 29.3 | 5.5 | 0.12 | 0.01 | 23.8 | 1.9 | 10 |

TABLE 2

Experimental example of insulation coating containing Si

| Experimental example | Oxidation degree in cooling process of final annealing process | Oxidation degree when intermediate layer is formed | Heating temperature when intermediate layer is formed | Oxidation degree in cooling process of intermediate layer and insulation coating forming process | Point A Depth (μm) | Point B Depth (μm) | Point B Mn standardized optical emission intensity |
|---|---|---|---|---|---|---|---|
| Example 9 | 1000 | 0.1 | 800° C. | 0.10 | 20.1 | 3.0 | 0.55 |
| Example 10 | 1000 | 0.1 | 800° C. | 0.15 | 15.2 | 4.7 | 0.60 |
| Example 11 | 1000 | 0.1 | 800° C. | 0.20 | 12.3 | 5.1 | 0.78 |
| Example 12 | 1000 | 0.1 | 800° C. | 0.30 | 15.7 | 5.3 | 0.71 |
| Example 13 | 1000 | 0.01 | 870° C. | 0.15 | 9.1 | 4.2 | 1.20 |
| Example 14 | 1000 | 0.01 | 870° C. | 0.20 | 5.3 | 3.4 | 0.84 |
| Example 15 | 0.3 | 0.01 | 870° C. | 0.20 | 9.8 | 4.4 | 1.10 |
| Example 16 | 50000 | 0.01 | 870° C. | 0.20 | 13.9 | 5.5 | 0.66 |
| Comparative example 5 | 1000 | 0.1 | 800° C. | 0.05 | 14.2 | 5.2 | 0.20 |
| Comparative example 6 | 1000 | 0.1 | 870° C. | 0.40 | 20.1 | 7.6 | 0.34 |
| Comparative example 7 | 0.2 | 0.1 | 870° C. | 0.20 | 21.3 | 10.1 | 0.42 |
| Comparative example 8 | 150000 | 0.1 | 870° C. | 0.20 | 28.1 | 6.5 | 0.11 |

| Experimental example | Mn standardized optical emission intensity difference between point B and point C | Distance between point A and point B (μm) | Distance between point W and point Z (μm) | Difference in Mn difference quotient between point Y and point X | Insulation film residual rate after bending Φ16 mm (%) |
|---|---|---|---|---|---|
| Example 9 | 0.04 | 17.1 | 1.6 | 0.62 | 40 |
| Example 10 | 0.12 | 10.5 | 1.1 | 0.33 | 51 |
| Example 11 | 0.15 | 7.2 | 0.7 | 0.04 | 71 |
| Example 12 | 0.30 | 10.4 | 1.2 | 0.73 | 49 |
| Example 13 | 0.21 | 4.9 | 1.1 | 0.98 | 56 |
| Example 14 | 0.33 | 1.9 | 0.1 | 0.90 | 87 |
| Example 15 | 0.21 | 5.4 | 0.2 | 0.71 | 80 |
| Example 16 | 0.12 | 8.4 | 0.4 | 0.55 | 76 |
| Comparative example 5 | 0.02 | 9.0 | 2.1 | 0.01 | 14 |
| Comparative example 6 | 0.03 | 12.5 | 3.5 | 0.01 | 12 |
| Comparative example 7 | 0.01 | 11.2 | 4.5 | 0.01 | 19 |

TABLE 2-continued

| Experimental example of insulation coating containing Si | | | | | |
|---|---|---|---|---|---|
| Comparative example 8 | 0.01 | 21.6 | 2.1 | 0.01 | 8 |

As shown in Table 1 and Table 2, the grain-oriented electrical steel sheets of Examples 1 to 16 had a high residual ratio of the insulation coating in the adhesion test for bending D16 mm, and had better adhesion of the insulation coating than that in the grain-oriented electrical steel sheets of Comparative examples.

That is, in the grain-oriented electrical steel sheet in which the base steel sheet contains Si and Mn as chemical components, the surface of the base steel sheet has substantially no final-annealed film, the surface of the base steel sheet has the intermediate layer containing a silicon oxide as a main component, and the surface of the intermediate layer has the insulation coating thereon, when a point having the maximum depth among points having the Mn standardized optical emission intensity of 0.9 was defined as the point A, and a region from the surface of the insulation coating to the depth of the point A was defined as the surface layer region in the profile for the depth of the Mn standardized optical emission intensity obtained from data of the optical emission intensity and the measurement time of Mn measured by the glow-discharge optical emission analysis on the grain-oriented electrical steel sheet, the grain-oriented electrical steel sheet having the point B at which the Mn standardized optical emission intensity was 0.50 or more and was also the local maximum in the surface layer region was excellent in adhesion of the insulation coating.

Among Examples 1 to 16, those which further satisfy any of the following conditions had a higher residual rate of the insulation coating. In addition, those which satisfy all of the following conditions had a particularly high residual rate of the insulation coating.

(1) The point C which is present between the point A and the point B in the surface layer region and has the local minimum Mn standardized optical emission intensity and the point B satisfy Equation 2 (Mn standardized optical emission intensity at point B−Mn standardized optical emission intensity at point C≥0.05).

(2) The distance between the point A and the point B in the depth direction is 0 to 10.0 μm.

(3) Regarding Examples of the grain-oriented electrical steel sheets having an insulation coating containing no Si (that is, Examples 1 to 8), in the profile for the depth of the Si standardized optical emission intensity obtained from the data of the optical emission intensity and the measurement time of Si measured by the glow-discharge optical emission analysis on the grain-oriented electrical steel sheet, the surface layer region has the point D at which the Si standardized optical emission intensity is the local maximum value, and the distance between the point B and the D in the depth direction is 0 to 1.0 μm.

(4) Regarding Examples of the grain-oriented electrical steel sheets having an insulation coating containing Si (that is, Examples 9 to 16), when the point at which the Si difference quotient is the local minimum and the Si difference quotient is −0.5 or less is defined as the point V and the point at which the Si difference quotient is the local maximum and which is present on the surface side of the insulation coating from the point V and is closest to the point V is defined as the point Z in the surface layer region in a profile for the depth of the Si difference quotient obtained from the Si standardized optical emission intensity, and the point at which the Mn difference quotient is the local maximum value is defined as the point Y, and the point at which the Mn difference quotient is minimum is defined as the point X, and the point which is present in the region from the point X to the point Y and has a Mn difference quotient of 0 is defined as the point W in the surface layer region in the profile for the depth of the Mn difference quotient obtained from the Mn standardized optical emission intensity, a distance between the point W and the point Z in the depth direction is 0 to 1.0 μm, and the Mn difference quotient at the point Y and the Mn difference quotient at the point X satisfy the relationship of Equation 7 (Mn difference quotient at the point Y−Mn difference quotient at the point X≥0.015).

When compared to Examples 1 to 16, the grain-oriented electrical steel sheets of Comparative examples 1 to 8 had a low residual ratio of the insulation coating, and the adhesion of the insulation coating was inferior to that in Examples 1 to 16.

That is, although it is the grain-oriented electrical steel sheet in which the base steel sheet contains Si and Mn as chemical components, the surface of the base steel sheet has substantially no final-annealed film, the surface of the base steel sheet has the intermediate layer containing a silicon oxide as a main component and the surface of the intermediate layer has the insulation coating thereon, when a point having the maximum depth among the points having the Mn standardized optical emission intensity of 0.9 is defined as the point A, and the region from the surface of the insulation coating to the depth of the point A is defined as the surface layer region in the profile for the depth of Mn standardized optical emission intensity obtained from the data of the optical emission intensity and the measurement time of Mn measured by the glow-discharge optical emission analysis on the grain-oriented electrical steel sheet, the grain-oriented electrical steel sheet not having the point B at which the Mn standardized optical emission intensity was 0.50 or more and was also the local maximum in the surface layer region did not have sufficient adhesion of the insulation coating.

In Comparative examples 1, 2, 5 and 6, the oxidation degree of the atmosphere in the cooling process of the intermediate layer and the insulation coating forming process was out of a desired range. In Comparative examples 3, 4, 7 and 8, the oxidation degree of the atmosphere in the cooling process of the final annealing process was out of a desired range. Therefore, the Mn standardized optical emission intensity of the comparative examples was out of a desired range.

Examples 17 to 20 and Comparative Examples 9 to 19

The chemical composition of the slab was changed to the chemical composition shown in Table 3, and a grain-oriented electrical steel sheet was obtained under the conditions shown in Table 4. The conditions other than the conditions shown in Table 3 were the same as in Example 1.

The base steel sheets of Examples 17 to 20 contain Si of 0.80% to 7.00%, Mn of 0.05% to 1.00%, C of 0.005% or less, and N of 0.0050% or less, and the remainder thereof is composed of Fe and impurities.

Examples 17 to 20 manufactured under preferable manufacturing conditions using slabs having a preferable chemical composition had a high residual ratio of the insulation coating. On the other hand, Comparative examples 9 to 19 manufactured using slabs having no preferable chemical composition or manufactured under manufacturing conditions other than the preferable manufacturing conditions had a low residual ratio of the insulation coating. The base steel sheets of the grain-oriented electrical steel sheets of Table 5 manufactured using slabs made of steels A to E in Table 3 were the base steel sheets having the chemical compositions of the steels A to E in Table 4.

TABLE 3

| Kind of steel | C | Mn | S | Se | Si | Acid-soluble Al | Cu | P | N |
|---|---|---|---|---|---|---|---|---|---|
| Steel A | 0.053 | 0.01 | 0.004 | 0.001 | 3.30 | 0.032 | 0.05 | 0.010 | 0.0080 |
| Steel B | 0.062 | 0.05 | 0.004 | 0.001 | 3.40 | 0.028 | 0.15 | 0.013 | 0.0078 |
| Steel C | 0.048 | 0.10 | 0.005 | 0.004 | 3.01 | 0.024 | 0.01 | 0.090 | 0.0081 |
| Steel D | 0.067 | 0.30 | 0.007 | 0.005 | 3.47 | 0.021 | 0.25 | 0.011 | 0.0087 |
| Steel E | 0.045 | 0.50 | 0.006 | 0.001 | 3.60 | 0.027 | 0.10 | 0.050 | 0.0095 |

TABLE 4

| | Composition of base steel sheet | | | | | | | | |
|---|---|---|---|---|---|---|---|---|---|
| Kind of steel | C | Mn | S | Se | Si | Acid-soluble Al | Cu | P | N |
| Steel A | 0.002 | 0.01 | 0.002 | 0.001 | 3.30 | 0.001 | 0.05 | 0.010 | 0.0015 |
| Steel B | 0.001 | 0.05 | 0.001 | 0.001 | 3.40 | 0.001 | 0.15 | 0.013 | 0.0012 |
| Steel C | 0.001 | 0.09 | 0.002 | 0.001 | 3.01 | 0.001 | 0.01 | 0.090 | 0.0018 |
| Steel D | 0.002 | 0.29 | 0.001 | 0.005 | 3.47 | 0.001 | 0.25 | 0.011 | 0.0019 |
| Steel E | 0.001 | 0.48 | 0.001 | 0.001 | 3.60 | 0.001 | 0.10 | 0.050 | 0.0014 |

TABLE 5

Experimental example of insulation coating containing Si (component dependence)

| Experimental example | Kind of steel | Oxidation degree in cooling process of final annealing process | Oxidation degree when intermediate layer is formed | Heating temperature when intermediate layer is formed | Oxidation degree in cooling process of intermediate layer and insulation coating forming process | Point A Depth (μm) | Point B Depth (μm) | Mn standardized optical emission intensity |
|---|---|---|---|---|---|---|---|---|
| Comparative example 9 | Steel A | 0.1 | 0.1 | 870° C. | 0.15 | 10.3 | 5.5 | 0.22 |
| Comparative example 10 | | 1000 | 0.1 | 870° C. | 0.15 | 20.6 | 3.6 | 0.27 |
| Comparative example 11 | | 1000 | 0.1 | 870° C. | 0.05 | 20.1 | 4.1 | 0.32 |
| Comparative example 12 | Steel B | 0.1 | 0.1 | 870° C. | 0.15 | 9.5 | 5.1 | 0.36 |
| Example 17 | | 1000 | 0.1 | 870° C. | 0.15 | 18.9 | 4.3 | 0.52 |
| Comparative example 13 | | 1000 | 0.1 | 870° C. | 0.05 | 19.3 | 3.6 | 0.22 |
| Comparative example 14 | Steel C | 0.1 | 0.1 | 870° C. | 0.15 | 8.9 | 4.1 | 0.41 |
| Example 18 | | 1000 | 0.1 | 870° C. | 0.15 | 16.9 | 7.3 | 0.66 |
| Comparative example 15 | | 1000 | 0.1 | 870° C. | 0.05 | 17.8 | 6.3 | 0.38 |
| Comparative example 16 | Steel D | 0.1 | 0.1 | 870° C. | 0.15 | 8.1 | 4.3 | 0.32 |
| Example 19 | | 1000 | 0.1 | 870° C. | 0.15 | 15.1 | 11.2 | 0.88 |
| Comparative example 17 | | 1000 | 0.1 | 870° C. | 0.05 | 14.3 | 8.9 | 0.46 |
| Comparative example 18 | Steel E | 0.1 | 0.1 | 870° C. | 0.15 | 6.5 | 8.0 | 0.40 |

TABLE 5-continued

Experimental example of insulation coating containing Si (component dependence)

| Example 20 | 1000 | 0.1 | 870° C. | 0.15 | 13.4 | 7.6 | 1.10 |
| Comparative example 19 | 1000 | 0.1 | 870° C. | 0.05 | 14.1 | 8.1 | 0.39 |

| Experimental example | Kind of steel | Mn standardized optical emission intensity difference between point B and point C | Distance between point A and point B (μm) | Distance between point W and point Z (μm) | Difference in difference quotient between point Y and point X | Insulation film residual rate after bending Φ16 mm (%) |
|---|---|---|---|---|---|---|
| Comparative example 9 | Steel A | 0.01 | 4.8 | 1.6 | 0.00 | 6 |
| Comparative example 10 | | 0.02 | 17.0 | 1.1 | 0.00 | 15 |
| Comparative example 11 | | 0.01 | 16.0 | 1.3 | 0.00 | 11 |
| Comparative example 12 | Steel B | 0.04 | 4.4 | 1.2 | 0.01 | 16 |
| Example 17 | | 0.05 | 14.6 | 1.1 | 0.01 | 51 |
| Comparative example 13 | | 0.03 | 15.7 | 1.2 | 0.01 | 23 |
| Comparative example 14 | Steel C | 0.04 | 4.8 | 1.6 | 0.01 | 18 |
| Example 18 | | 0.12 | 9.6 | 0.9 | 0.42 | 69 |
| Comparative example 15 | | 0.02 | 11.5 | 2.1 | 0.01 | 19 |
| Comparative example 16 | Steel D | 0.03 | 3.8 | 3.5 | 0.01 | 16 |
| Example 19 | | 0.32 | 3.9 | 0.9 | 0.46 | 76 |
| Comparative example 17 | | 0.01 | 5.4 | 2.1 | 0.01 | 24 |
| Comparative example 18 | Steel E | 0.03 | −1.5 | 3.5 | 0.01 | 27 |
| Example 20 | | 0.56 | 5.8 | 0.3 | 0.81 | 81 |
| Comparative example 19 | | 0.01 | 6.0 | 2.1 | 0.01 | 24 |

INDUSTRIAL APPLICABILITY

According to the aspect of the present invention, it is possible to provide a grain-oriented electrical steel sheet having an intermediate layer containing a silicon oxide as a main component and having excellent adhesion of an insulation coating, and a method for manufacturing the same.

BRIEF DESCRIPTION OF THE REFERENCE SYMBOLS

1 Base steel sheet
2A Final-annealed film
2B Intermediate layer
3 Insulation coating
a Peak portion
b Valley portion

The invention claimed is:
1. A grain-oriented electrical steel sheet, comprising:
a base steel sheet, wherein the base steel sheet has a composition comprising, in mass %:
Si: 0.50% to 7.00%;
Mn: 0.05% to 1.00%;
C: 0.005% or less,
N: 0.0050% or less, and
optionally comprising,
acid-soluble Al: 0.0065% or less;
S and Se: 0.001% or less in total;
Bi: 0.010% or less;
B: 0.0080% or less;
Ti: 0.015% or less;
Nb: 0.020% or less;
V: 0.015% or less;
Sn: 0.50% or less;
Sb: 0.50% or less;
Cr: 0.30% or less;
Cu: 0.40% or less;
P: 0.50% or less;
Ni: 1.00% or less;
Mo: 0.10% or less; and
a remainder of Fe and impurities;
an intermediate layer which is disposed on a surface of the base steel sheet, the intermediate layer comprising an Fe content of less than 30 atomic %, a P content of less than 5 atomic %, a Si content of 20 atomic % or more and less than 50 atomic %, an O content of 50 atomic % or more and less than 80 atomic %, and a Mg content of 10 atomic % or less; and
an insulation coating which is disposed on a surface of the intermediate layer,
wherein a final-annealed film is not present on a surface of the base steel sheet, and
in a surface layer region,
a Mn-depleted layer having a valley portion of a Mn content in which a Mn content is lower than an average Mn content of the base steel sheet in a region deeper than the surface layer region is provided, and a Mn-rich layer having a peak portion of a Mn content in which a Mn content is higher than that in the valley portion of the Mn content is provided in a region closer to a surface of the insulation coating than the Mn-depleted layer, and wherein:

in a profile for a depth of a Mn standardized optical emission intensity calculated using the following Equations 1-1 and 1-2 from data of an optical emission intensity and a measurement time of Mn measured by a glow-discharge optical emission analysis for the grain-oriented electrical steel sheet, when a point having a maximum depth among points having a Mn standardized optical emission intensity of 0.9 is defined as a point A, the surface layer region is a region from the surface of the insulation coating to a depth of the point A, a point B at which the Mn standardized optical emission intensity is 0.50 or more and is the maximum is located in the surface layer region, a point C at which the Mn standardized optical emission intensity is the minimum is located between the point A and the point B in the surface layer region, the valley portion of the Mn content is a region having a depth of of 0.1 µm before and after the point C, the peak portion of the Mn content is a region having a depth of 0.1 µm before and after the point B, and when an intermediate depth between the depth of the point B and the depth of the point C is defined as a boundary depth, and the Mn standardized optical emission intensity at the boundary depth is defined as a boundary Mn standardized optical emission intensity, the Mn-depleted layer is a region from the boundary depth to the depth of the point A, and the Mn-rich layer is present on the surface side of the insulation coating from the point B and is a region from a depth of a point having the same Mn standardized optical emission intensity as the boundary Mn standardized optical emission intensity to the boundary depth, depth of $d$ µm of each of measurement points=(measurement depth after measurement end, unit µm)/(time until measurement end, unit seconds)×(measurement time of measurement point, unit seconds),       Equation 1-1:

Mn standardized optical emission intensity at depth of $d$ µm=(optical emission intensity of Mn at depth of $d$ µm)/(average optical emission intensity of Mn at depth of 25 µm to 30 µm).       Equation 1-2:

2. The grain-oriented electrical steel sheet according to claim 1, wherein the point B and the point C in the surface layer region satisfy a relationship of the following Equation 2, (Mn standardized optical emission intensity at point $B$)−(Mn standardized optical emission intensity at point $C$)≥0.05.       Equation 2:

3. The grain-oriented electrical steel sheet according to claim 1, wherein a distance between the point A and the point B in a depth direction calculated from the following Equation 3 is 0 to 10.0 µm, distance between point $A$ and point $B$ in depth direction in unit µm=(depth at point $B$, unit µm)−(depth at point $A$, unit µm).       Equation 3:

4. The grain-oriented electrical steel sheet according to claim 1, wherein:

the insulation coating contains no Si, in a profile for a depth of a Si standardized optical emission intensity calculated using the following Equations 2-1 and 2-2 from data of an optical emission intensity and a measurement time of Si measured by the glow-discharge optical emission analysis for the grain-oriented electrical steel sheet, the surface layer region has a point D at which the Si standardized optical emission intensity is the maximum, and a distance between the point B and the point D in the depth direction calculated from the following Equation 4 is 0 to 1.0 µm, depth $d$ µm of each of measurement points=(measurement depth after measurement end, unit µm)/(time until measurement end, unit seconds)×(measurement time of measurement point, unit seconds),       Equation 2-1:

Si standardized optical emission intensity at depth of $d$ µm=(optical emission intensity of Si at depth of $d$ µm)/(average optical emission intensity of Si at depth of 25 µm to 30 µm),       Equation 2-2:

distance in unit µm between point $B$ and point $D$ in depth direction=(depth at point $B$, unit µm)−(depth at point $D$, unit µm).       Equation 4:

5. The grain-oriented electrical steel sheet according to claim 1, wherein:

the insulation coating contains Si, when, in a profile for a depth of a Si standardized optical emission intensity calculated using the following Equations 2-1 and 2-2 from data of an optical emission intensity and a measurement time of Si measured by the glow-discharge optical emission analysis for the grain-oriented electrical steel sheet, and a profile for a depth of a Si difference quotient calculated using the following Equation 5-1, in the surface layer region, in a region in which the Si difference quotient is a negative value, a point at which the Si difference quotient is the minimum and the Si difference quotient is −0.5 or less is defined as a point V, and a point at which the Si difference quotient is the maximum, is present on the surface side of the insulation coating from the point V, and is closest to the point V is defined as a point Z, and in a profile for a depth of a Mn difference quotient calculated from the Mn standardized optical emission intensity using the following Equation 5-2, in the surface layer region, a point at which the Mn difference quotient is maximum is defined as a point Y, and a point at which the Mn difference quotient is minimum is defined as a point X, and a point which is present in a region from the point X to the point Y and at which the Mn difference quotient is 0 is defined as a point W, a distance between the point W and the point Z in the depth direction calculated from the following Equation 6 is 0 to 1.0 µm, and the Mn difference quotient at the point Y and the Mn difference quotient at the point X satisfy a relationship of the following Equation 7, depth $d$ µm of each of measurement points=(measurement depth after measurement end, unit µm)/(time until measurement end, unit seconds)×(measurement time of measurement point, unit seconds),       Equation 2-1:

Si standardized optical emission intensity at depth of $d$ µm=(optical emission intensity of Si at depth of $d$ µm)/(average optical emission intensity of Si at depth of 25 µm to 30 µm),       Equation 2-2:

Si difference quotient at depth of $d$ μm={Si standardized optical emission intensity at depth of $d$ μm−Si standardized optical emission intensity at depth $(d−h)$ μm}/$h$ μm,   Equation 5-1:

Mn difference quotient at depth $d$ μm={Mn standardized optical emission intensity at depth of $d$ μm−Mn standardized optical emission intensity at depth $(d−h)$ μm}/$h$ μm,   Equation 5-2:

distance in unit μm between point $W$ and point $Z$ in the depth direction=(depth at point $W$, unit μm)−(depth at point $Z$, unit μm),   Equation 6:

(Mn difference quotient at point $Y$)−(Mn difference quotient at point $X$)≥0.015,   Equation 7:

wherein, in the above-described Equations 5-1 and 5-2, h indicates a sampling interval of the data in μm in the glow-discharge optical emission analysis.

6. The grain-oriented electrical steel sheet according to claim 2, wherein a distance between the point A and the point B in a depth direction calculated from the following Equation 3 is 0 to 10.0 μm, distance between point $A$ and point $B$ in depth direction in unit μm=(depth at point $B$, unit μm)−(depth at point $A$, unit μm).   Equation 3:

7. The grain-oriented electrical steel sheet according to claim 2, wherein:
the insulation coating contains no Si,
in a profile for a depth of a Si standardized optical emission intensity calculated using the following Equations 2-1 and 2-2 from data of an optical emission intensity and a measurement time of Si measured by the glow-discharge optical emission analysis for the grain-oriented electrical steel sheet, the surface layer region has a point D at which the Si standardized optical emission intensity is the maximum, and
a distance between the point B and the point D in the depth direction calculated from the following Equation 4 is 0 to 1.0 μm, depth $d$ μm of each of measurement points=(measurement depth after measurement end, unit μm)/(time until measurement end, unit seconds)×(measurement time of measurement point, unit seconds),   Equation 2-1:

Si standardized optical emission intensity at depth of $d$ μm=(optical emission intensity of Si at depth of $d$ μm)/(average optical emission intensity of Si at depth of 25 μm to 30 μm),   Equation 2-2:

distance in unit μm between point $B$ and point $D$ in depth direction=(depth at point $B$, unit μm)−(depth at point $D$, unit μm).   Equation 4:

8. The grain-oriented electrical steel sheet according to claim 2, wherein:
the insulation coating contains Si,
when, in a profile for a depth of a Si standardized optical emission intensity calculated using the following Equations 2-1 and 2-2 from data of an optical emission intensity and a measurement time of Si measured by the glow-discharge optical emission analysis for the grain-oriented electrical steel sheet, and a profile for a depth of a Si difference quotient calculated using the following Equation 5-1,
in the surface layer region, in a region in which the Si difference quotient is a negative value, a point at which the Si difference quotient is the minimum and the Si difference quotient is −0.5 or less is defined as a point V, and a point at which the Si difference quotient is the maximum, is present on the surface side of the insulation coating from the point V, and is closest to the point V is defined as a point Z, and
in a profile for a depth of a Mn difference quotient calculated from the Mn standardized optical emission intensity using the following Equation 5-2,
in the surface layer region, a point at which the Mn difference quotient is maximum is defined as a point Y, and a point at which the Mn difference quotient is minimum is defined as a point X, and
a point which is present in a region from the point X to the point Y and at which the Mn difference quotient is 0 is defined as a point W,
a distance between the point W and the point Z in the depth direction calculated from the following Equation 6 is 0 to 1.0 μm, and
the Mn difference quotient at the point Y and the Mn difference quotient at the point X satisfy a relationship of the following Equation 7, depth $d$ μm of each of measurement points=(measurement depth after measurement end, unit μm)/(time until measurement end, unit seconds)×(measurement time of measurement point, unit seconds),   Equation 2-1:

Si standardized optical emission intensity at depth of $d$ μm=(optical emission intensity of Si at depth of $d$ μm)/(average optical emission intensity of Si at depth of 25 μm to 30 μm),   Equation 2-2:

Si difference quotient at depth of $d$ μm={Si standardized optical emission intensity at depth of $d$ μm−Si standardized optical emission intensity at depth $(d−h)$ μm}/$h$ μm,   Equation 5-1:

Mn difference quotient at depth $d$ μm={Mn standardized optical emission intensity at depth of $d$ μm−Mn standardized optical emission intensity at depth $(d−h)$ μm}/$h$ μm,   Equation 5-2:

distance in unit μm between point $W$ and point $Z$ in the depth direction=(depth at point $W$, unit μm)−(depth at point $Z$, unit μm),   Equation 6:

(Mn difference quotient at point $Y$)−(Mn difference quotient at point $X$)≥0.015,   Equation 7:

wherein, in the above-described Equations 5-1 and 5-2, h indicates a sampling interval of the data in μm in the glow-discharge optical emission analysis.

9. The grain-oriented electrical steel sheet according to claim 3, wherein:
the insulation coating contains no Si,
in a profile for a depth of a Si standardized optical emission intensity calculated using the following Equations 2-1 and 2-2 from data of an optical emission intensity and a measurement time of Si measured by the glow-discharge optical emission analysis for the grain-oriented electrical steel sheet, the surface layer region has a point D at which the Si standardized optical emission intensity is the maximum, and
a distance between the point B and the point D in the depth direction calculated from the following Equation 4 is 0 to 1.0 μm, depth $d$ μm of each of measurement points=(measurement depth after measurement end, unit μm)/(time until measurement end, unit seconds)×(measurement time of measurement point, unit seconds),   Equation 2-1:

Si standardized optical emission intensity at depth of $d$ μm=(optical emission intensity of Si at depth of $d$ μm)/(average optical emission intensity of Si at depth of 25 μm to 30 μm),     Equation 2-2:

distance in unit μm between point $B$ and point $D$ in depth direction=(depth at point $B$, unit μm)−(depth at point $D$, unit μm).     Equation 4:

10. The grain-oriented electrical steel sheet according to claim 3, wherein:

the insulation coating contains Si, when, in a profile for a depth of a Si standardized optical emission intensity calculated using the following Equations 2-1 and 2-2 from data of an optical emission intensity and a measurement time of Si measured by the glow-discharge optical emission analysis for the grain-oriented electrical steel sheet, and a profile for a depth of a Si difference quotient calculated using the following Equation 5-1, in the surface layer region, in a region in which the Si difference quotient is a negative value, a point at which the Si difference quotient is the minimum and the Si difference quotient is −0.5 or less is defined as a point V, and a point at which the Si difference quotient is the maximum, is present on the surface side of the insulation coating from the point V, and is closest to the point V is defined as a point Z, and in a profile for a depth of a Mn difference quotient calculated from the Mn standardized optical emission intensity using the following Equation 5-2, in the surface layer region, a point at which the Mn difference quotient is maximum is defined as a point Y, and a point at which the Mn difference quotient is minimum is defined as a point X, and a point which is present in a region from the point X to the point Y and at which the Mn difference quotient is 0 is defined as a point W, a distance between the point W and the point Z in the depth direction calculated from the following Equation 6 is 0 to 1.0 μm, and the Mn difference quotient at the point Y and the Mn difference quotient at the point X satisfy a relationship of the following Equation 7:

depth $d$ μm of each of measurement points=(measurement depth after measurement end, unit μm)/(time until measurement end, unit seconds)×(measurement time of measurement point, unit seconds),     Equation 2-1:

Si standardized optical emission intensity at depth of $d$ μm=(optical emission intensity of Si at depth of $d$ μm)/(average optical emission intensity of Si at depth of 25 μm to 30 μm),     Equation 2-2:

Si difference quotient at depth of $d$ μm={Si standardized optical emission intensity at depth of $d$ μm−Si standardized optical emission intensity at depth $(d-h)$ μm}/$h$ μm,     Equation 5-1:

Mn difference quotient at depth $d$ μm={Mn standardized optical emission intensity at depth of $d$ μm−Mn standardized optical emission intensity at depth $(d-h)$ μm}/$h$ μm,     Equation 5-2:

distance in unit μm between point $W$ and point $Z$ in the depth direction=(depth at point $W$, unit μm)−(depth at point $Z$, unit μm),     Equation 6:

(Mn difference quotient at point $Y$)−(Mn difference quotient at point $X$)≥0.015,     Equation 7:

wherein, in the above-described Equations 5-1 and 5-2, h indicates a sampling interval of the data in μm in the glow-discharge optical emission analysis.

11. A method for manufacturing the grain-oriented electrical steel sheet according to claim 1, comprising:

a hot rolling process of heating and then hot-rolling a slab with the composition of claim 1 and obtaining a hot-rolled steel sheet;

a hot-band annealing process of performing hot-band annealing on the hot-rolled steel sheet and obtaining an annealed steel sheet;

a cold rolling process of cold-rolling the annealed steel sheet once, or twice or more with intermediate annealing interposed therebetween, and obtaining a cold-rolled steel sheet;

a decarburization annealing process of performing decarburization annealing on the cold-rolled steel sheet and obtaining a decarburization-annealed steel sheet;

a final annealing process of heating the decarburization-annealed steel sheet in a state which an annealing separator having a MgO content of 10 mass % to 50 mass % is applied to the surface of the decarburization-annealed steel sheet, then removing the annealing separator from the surface, and obtaining a final-annealed steel sheet;

an intermediate layer forming process of performing thermal oxidation annealing on the final-annealed steel sheet and forming an intermediate layer on a surface of the final-annealed steel sheet; and an insulation coating forming process of forming an insulation coating on the intermediate layer, wherein, in a cooling process of the final annealing process, when a final annealing temperature is 1100° C. or higher, T1 is set to 1100° C., and when the final annealing temperature is less than 1100° C., T1 is set as the final annealing temperature, cooling in a temperature range of T1 to 500° C. is performed in an atmosphere of an oxidation degree ($P_{H2O}/P_{H2}$) of 0.3 to 100000, and in a cooling process of the insulation coating forming process, cooling in a temperature range of 800° C. to 600° C. is performed in an atmosphere of an oxidation degree ($P_{H2O}/P_{H2}$) of 0.10 to 0.30 for a residence time of 10 seconds to 60 seconds.

12. A method for manufacturing the grain-oriented electrical steel sheet according to claim 1, comprising:

a hot rolling process of heating and then hot-rolling a slab with the composition of claim 1 and obtaining a hot-rolled steel sheet;

a hot-band annealing process of performing hot-band annealing on the hot-rolled steel sheet and obtaining an annealed steel sheet;

a cold rolling process of cold-rolling the annealed steel sheet once, or twice or more with intermediate annealing interposed therebetween, and obtaining a cold-rolled steel sheet;

a decarburization annealing process of performing decarburization annealing on the cold-rolled steel sheet and obtaining a decarburization-annealed steel sheet;

a final annealing process of heating the decarburization-annealed steel sheet in a state which an annealing separator having a MgO content of 10 mass % to 50 mass % is applied to the surface of the decarburization-annealed steel sheet, then removing the annealing separator on the surface, and obtaining a final-annealed steel sheet; and an intermediate layer and insulation coating forming process of forming an intermediate layer and an insulation coating on a surface of the final-annealed steel sheet in one process, wherein, in a cooling process of the final annealing process, when a final annealing temperature is 1100° C. or higher, T1 is set to 1100° C., and when the final annealing temperature is less than 1100° C., T1 is set as the final annealing temperature, cooling in a temperature range of T1 to 500° C. is performed in an atmosphere of an oxidation degree ($P_{H2O}/P_{H2}$) of 0.3 to 100000, in the intermediate layer and insulation coating forming process, an atmosphere in a temperature range of 800° C. to 1150° C. is set to an oxidation degree ($P_{H2O}/P_{H2}$) of 0.05 to 0.18, and in a cooling process of the intermediate layer and insulation coating forming process, cooling in a temperature range of 800° C. to 600° C. is performed in an atmosphere of an oxidation degree ($P_{H2O}/P_{H2}$) of 0.10 to 0.30 for a residence time of 10 seconds to 60 seconds.

13. A method for manufacturing the grain-oriented electrical steel sheet according to claim 2, comprising:

a hot rolling process of heating and then hot-rolling a slab and obtaining a hot-rolled steel sheet;

a hot-band annealing process of performing hot-band annealing on the hot-rolled steel sheet and obtaining an annealed steel sheet;

a cold rolling process of cold-rolling the annealed steel sheet once, or twice or more with intermediate annealing interposed therebetween, and obtaining a cold-rolled steel sheet;

a decarburization annealing process of performing decarburization annealing on the cold-rolled steel sheet and obtaining a decarburization-annealed steel sheet;

a final annealing process of heating the decarburization-annealed steel sheet in a state which an annealing separator having a MgO content of 10 mass % to 50 mass % is applied to the surface of the decarburization-annealed steel sheet, then removing the annealing separator from the surface, and obtaining a final-annealed steel sheet;

an intermediate layer forming process of performing thermal oxidation annealing on the final-annealed steel sheet and forming an intermediate layer on a surface of the final-annealed steel sheet; and an insulation coating forming process of forming an insulation coating on the intermediate layer, wherein, in a cooling process of the final annealing process, when a final annealing temperature is 1100° C. or higher, T1 is set to 1100° C., and when the final annealing temperature is less than 1100° C., T1 is set as the final annealing temperature, cooling in a temperature range of T1 to 500° C. is performed in an atmosphere of an oxidation degree ($P_{H2O}/P_{H2}$) of 0.3 to 100000, and in a cooling process of the insulation coating forming process, cooling in a temperature range of 800° C. to 600° C. is performed in an atmosphere of an oxidation degree ($P_{H2O}/P_{H2}$) of 0.10 to 0.30 for a residence time of 10 seconds to 60 seconds, wherein the slab has a composition comprising, in mass %:
Si: 0.50% to 7.00%;
Mn: 0.05% to 1.00%;
C: 0.005% or less,
N: 0.0050% or less, and
optionally comprising,
acid-soluble Al: 0.0065% or less;
S and Se: 0.001% or less in total;
Bi: 0.010% or less;
B: 0.0080% or less;
Ti: 0.015% or less;
Nb: 0.020% or less;
V: 0.015% or less;
Sn: 0.50% or less;
Sb: 0.50% or less;
Cr: 0.30% or less;
Cu: 0.40% or less;
P: 0.50% or less;
Ni: 1.00% or less;
Mo: 0.10% or less; and
a remainder of Fe and impurities.

14. A method for manufacturing the grain-oriented electrical steel sheet according to claim 2, comprising:

a hot rolling process of heating and then hot-rolling a slab and obtaining a hot-rolled steel sheet;

a hot-band annealing process of performing hot-band annealing on the hot-rolled steel sheet and obtaining an annealed steel sheet;

a cold rolling process of cold-rolling the annealed steel sheet once, or twice or more with intermediate annealing interposed therebetween, and obtaining a cold-rolled steel sheet;

a decarburization annealing process of performing decarburization annealing on the cold-rolled steel sheet and obtaining a decarburization-annealed steel sheet;

a final annealing process of heating the decarburization-annealed steel sheet in a state which an annealing separator having a MgO content of 10 mass % to 50 mass % is applied to the surface of the decarburization-annealed steel sheet, then removing the annealing separator on the surface, and obtaining a final-annealed steel sheet; and an intermediate layer and insulation coating forming process of forming an intermediate layer and an insulation coating on a surface of the final-annealed steel sheet in one process, wherein, in a cooling process of the final annealing process, when a final annealing temperature is 1100° C. or higher, T1 is set to 1100° C., and when the final annealing temperature is less than 1100° C., T1 is set as the final annealing temperature, cooling in a temperature range of T1 to 500° C. is performed in an atmosphere of an oxidation degree ($P_{H2O}/P_{H2}$) of 0.3 to 100000, in the intermediate layer and insulation coating forming process, an atmosphere in a temperature range of 800° C. to 1150° C. is set to an oxidation degree ($P_{H2O}/P_{H2}$) of 0.05 to 0.18, and in a cooling process of the intermediate layer and insulation coating forming process, cooling in a temperature range of 800° C. to 600° C. is performed in an atmosphere of an oxidation degree ($P_{H2O}/P_{H2}$) of 0.10 to 0.30 for a residence time of 10 seconds to 60 seconds, wherein the slab has a composition comprising, in mass %:
Si: 0.50% to 7.00%;
Mn: 0.05% to 1.00%;
C: 0.005% or less,
N: 0.0050% or less, and
optionally comprising,
acid-soluble Al: 0.0065% or less;
S and Se: 0.001% or less in total;
Bi: 0.010% or less;
B: 0.0080% or less;
Ti: 0.015% or less;
Nb: 0.020% or less;
V: 0.015% or less;
Sn: 0.50% or less;
Sb: 0.50% or less;
Cr: 0.30% or less;
Cu: 0.40% or less;
P: 0.50% or less;
Ni: 1.00% or less;
Mo: 0.10% or less; and
a remainder of Fe and impurities.

15. A method for manufacturing the grain-oriented electrical steel sheet according to claim 3, comprising:
a hot rolling process of heating and then hot-rolling a slab and obtaining a hot-rolled steel sheet;
a hot-band annealing process of performing hot-band annealing on the hot-rolled steel sheet and obtaining an annealed steel sheet;
a cold rolling process of cold-rolling the annealed steel sheet once, or twice or more with intermediate annealing interposed therebetween, and obtaining a cold-rolled steel sheet;
a decarburization annealing process of performing decarburization annealing on the cold-rolled steel sheet and obtaining a decarburization-annealed steel sheet;
a final annealing process of heating the decarburization-annealed steel sheet in a state which an annealing separator having a MgO content of 10 mass % to 50 mass % is applied to the surface of the decarburization-annealed steel sheet, then removing the annealing separator from the surface, and obtaining a final-annealed steel sheet;
an intermediate layer forming process of performing thermal oxidation annealing on the final-annealed steel sheet and forming an intermediate layer on a surface of the final-annealed steel sheet; and
an insulation coating forming process of forming an insulation coating on the intermediate layer,
wherein, in a cooling process of the final annealing process,
when a final annealing temperature is 1100° C. or higher, T1 is set to 1100° C., and when the final annealing temperature is less than 1100° C., T1 is set as the final annealing temperature,
cooling in a temperature range of T1 to 500° C. is performed in an atmosphere of an oxidation degree ($P_{H2O}/P_{H2}$) of 0.3 to 100000, and
in a cooling process of the insulation coating forming process, cooling in a temperature range of 800° C. to 600° C. is performed in an atmosphere of an oxidation degree ($P_{H2O}/P_{H2}$) of 0.10 to 0.30 for a residence time of 10 seconds to 60 seconds, wherein the slab has a composition comprising, in mass %:
Si: 0.50% to 7.00%;
Mn: 0.05% to 1.00%;
C: 0.005% or less,
N: 0.0050% or less, and
optionally comprising,
acid-soluble Al: 0.0065% or less;
S and Se: 0.001% or less in total;
Bi: 0.010% or less;
B: 0.0080% or less;
Ti: 0.015% or less;
Nb: 0.020% or less;
V: 0.015% or less;
Sn: 0.50% or less;
Sb: 0.50% or less;
Cr: 0.30% or less;
Cu: 0.40% or less;
P: 0.50% or less;
Ni: 1.00% or less;
Mo: 0.10% or less; and
a remainder of Fe and impurities.

16. A method for manufacturing the grain-oriented electrical steel sheet according to claim 4, comprising:
a hot rolling process of heating and then hot-rolling a slab and obtaining a hot-rolled steel sheet;
a hot-band annealing process of performing hot-band annealing on the hot-rolled steel sheet and obtaining an annealed steel sheet;
a cold rolling process of cold-rolling the annealed steel sheet once, or twice or more with intermediate annealing interposed therebetween, and obtaining a cold-rolled steel sheet;
a decarburization annealing process of performing decarburization annealing on the cold-rolled steel sheet and obtaining a decarburization-annealed steel sheet;
a final annealing process of heating the decarburization-annealed steel sheet in a state which an annealing separator having a MgO content of 10 mass % to 50 mass % is applied to the surface of the decarburization-annealed steel sheet, then removing the annealing separator from the surface, and obtaining a final-annealed steel sheet;
an intermediate layer forming process of performing thermal oxidation annealing on the final-annealed steel sheet and forming an intermediate layer on a surface of the final-annealed steel sheet; and
an insulation coating forming process of forming an insulation coating on the intermediate layer,
wherein, in a cooling process of the final annealing process,
when a final annealing temperature is 1100° C. or higher, T1 is set to 1100° C., and when the final annealing temperature is less than 1100° C., T1 is set as the final annealing temperature,
cooling in a temperature range of T1 to 500° C. is performed in an atmosphere of an oxidation degree ($P_{H2O}/P_{H2}$) of 0.3 to 100000, and
in a cooling process of the insulation coating forming process, cooling in a temperature range of 800° C. to 600° C. is performed in an atmosphere of an oxidation degree ($P_{H2O}/P_{H2}$) of 0.10 to 0.30 for a residence time of 10 seconds to 60 seconds,
wherein the slab has a composition comprising, in mass %:
Si: 0.50% to 7.00%;
Mn: 0.05% to 1.00%;
C: 0.005% or less,
N: 0.0050% or less, and
optionally comprising,
acid-soluble Al: 0.0065% or less;
S and Se: 0.001% or less in total;
Bi: 0.010% or less;
B: 0.0080% or less;
Ti: 0.015% or less;
Nb: 0.020% or less;
V: 0.015% or less;
Sn: 0.50% or less;
Sb: 0.50% or less;
Cr: 0.30% or less;
Cu: 0.40% or less;
P: 0.50% or less;
Ni: 1.00% or less;
Mo: 0.10% or less; and
a remainder of Fe and impurities.

17. A method for manufacturing the grain-oriented electrical steel sheet according to claim 5, comprising:
a hot rolling process of heating and then hot-rolling a slab and obtaining a hot-rolled steel sheet;
a hot-band annealing process of performing hot-band annealing on the hot-rolled steel sheet and obtaining an annealed steel sheet;
a cold rolling process of cold-rolling the annealed steel sheet once, or twice or more with intermediate annealing interposed therebetween, and obtaining a cold-rolled steel sheet;
a decarburization annealing process of performing decarburization annealing on the cold-rolled steel sheet and obtaining a decarburization-annealed steel sheet;
a final annealing process of heating the decarburization-annealed steel sheet in a state which an annealing separator having a MgO content of 10 mass % to 50 mass % is applied to the surface of the decarburization-annealed steel sheet, then removing the annealing separator from the surface, and obtaining a final-annealed steel sheet;
an intermediate layer forming process of performing thermal oxidation annealing on the final-annealed steel sheet and forming an intermediate layer on a surface of the final-annealed steel sheet; and
an insulation coating forming process of forming an insulation coating on the intermediate layer,
wherein, in a cooling process of the final annealing process,
when a final annealing temperature is 1100° C. or higher, T1 is set to 1100° C., and when the final annealing temperature is less than 1100° C., T1 is set as the final annealing temperature,
cooling in a temperature range of T1 to 500° C. is performed in an atmosphere of an oxidation degree ($P_{H2O}/P_{H2}$) of 0.3 to 100000, and
in a cooling process of the insulation coating forming process,
cooling in a temperature range of 800° C. to 600° C. is performed in an atmosphere of an oxidation degree ($P_{H2O}/P_{H2}$) of 0.10 to 0.30 for a residence time of 10 seconds to 60 seconds,
wherein the slab has a composition comprising, in mass %:
Si: 0.50% to 7.00%;
Mn: 0.05% to 1.00%;
C: 0.005% or less,
N: 0.0050% or less, and
optionally comprising,
acid-soluble Al: 0.0065% or less;
S and Se: 0.001% or less in total;
Bi: 0.010% or less;
B: 0.0080% or less;
Ti: 0.015% or less;
Nb: 0.020% or less;
V: 0.015% or less;
Sn: 0.50% or less;
Sb: 0.50% or less;
Cr: 0.30% or less;
Cu: 0.40% or less;
P: 0.50% or less;
Ni: 1.00% or less;
Mo: 0.10% or less; and
a remainder of Fe and impurities.

* * * * *